United States Patent
Lee et al.

(10) Patent No.: US 9,996,398 B2
(45) Date of Patent: Jun. 12, 2018

(54) APPLICATION PROCESSOR AND SYSTEM ON CHIP

(71) Applicant: SAMSUNG ELECTRONICS CO., LTD., Suwon-si (KR)

(72) Inventors: Gyeong Taek Lee, Suwon-si (KR); Seung Kyu Kim, Sejong-si (KR); Kyung Min Park, Incheon (KR); Jong Lae Park, Anyang-si (KR); Ji Eun Park, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 15/138,366

(22) Filed: Apr. 26, 2016

(65) Prior Publication Data

US 2016/0321102 A1    Nov. 3, 2016

(30) Foreign Application Priority Data

Apr. 29, 2015    (KR) .................. 10-2015-0060581

(51) Int. Cl.
   *G06F 9/50* (2006.01)
   *G06F 9/48* (2006.01)

(52) U.S. Cl.
   CPC .......... *G06F 9/5088* (2013.01); *G06F 9/4893* (2013.01); *Y02D 10/24* (2018.01)

(58) Field of Classification Search
   CPC .................................................. G06F 9/5088
   See application file for complete search history.

(56) References Cited

U.S. PATENT DOCUMENTS

| | | | |
|---|---|---|---|
| 7,437,581 B2 | 10/2008 | Grochowski et al. | |
| 8,683,243 B2 | 3/2014 | Wu et al. | |
| 8,880,924 B2 | 11/2014 | Ko et al. | |
| 8,881,157 B2 | 11/2014 | Wolfe et al. | |
| 8,930,436 B2 | 1/2015 | Kim et al. | |
| 2004/0059875 A1* | 3/2004 | Garg | G06F 12/0806 711/141 |
| 2011/0066830 A1 | 3/2011 | Wolfe et al. | |
| 2013/0212594 A1 | 8/2013 | Choi et al. | |
| 2013/0262902 A1 | 10/2013 | Herdrich et al. | |
| 2013/0328891 A1 | 12/2013 | Lyashevsky | |
| 2014/0101411 A1* | 4/2014 | Sakarda | G06F 9/3885 712/42 |
| 2014/0173623 A1* | 6/2014 | Chang | G06F 9/5088 718/105 |
| 2014/0373025 A1 | 12/2014 | Kim | |

FOREIGN PATENT DOCUMENTS

KR    10-2014-0092066 A    7/2014

* cited by examiner

*Primary Examiner* — Charlie Sun
(74) *Attorney, Agent, or Firm* — Sughrue Mion, PLLC

(57) ABSTRACT

An application processor includes a first core and a second core. The first core is configured to implement a scheduler which monitors a workload of a task of the first core, and the first core is further configured to implement an idle checker which determines whether the second core is idle.

17 Claims, 16 Drawing Sheets

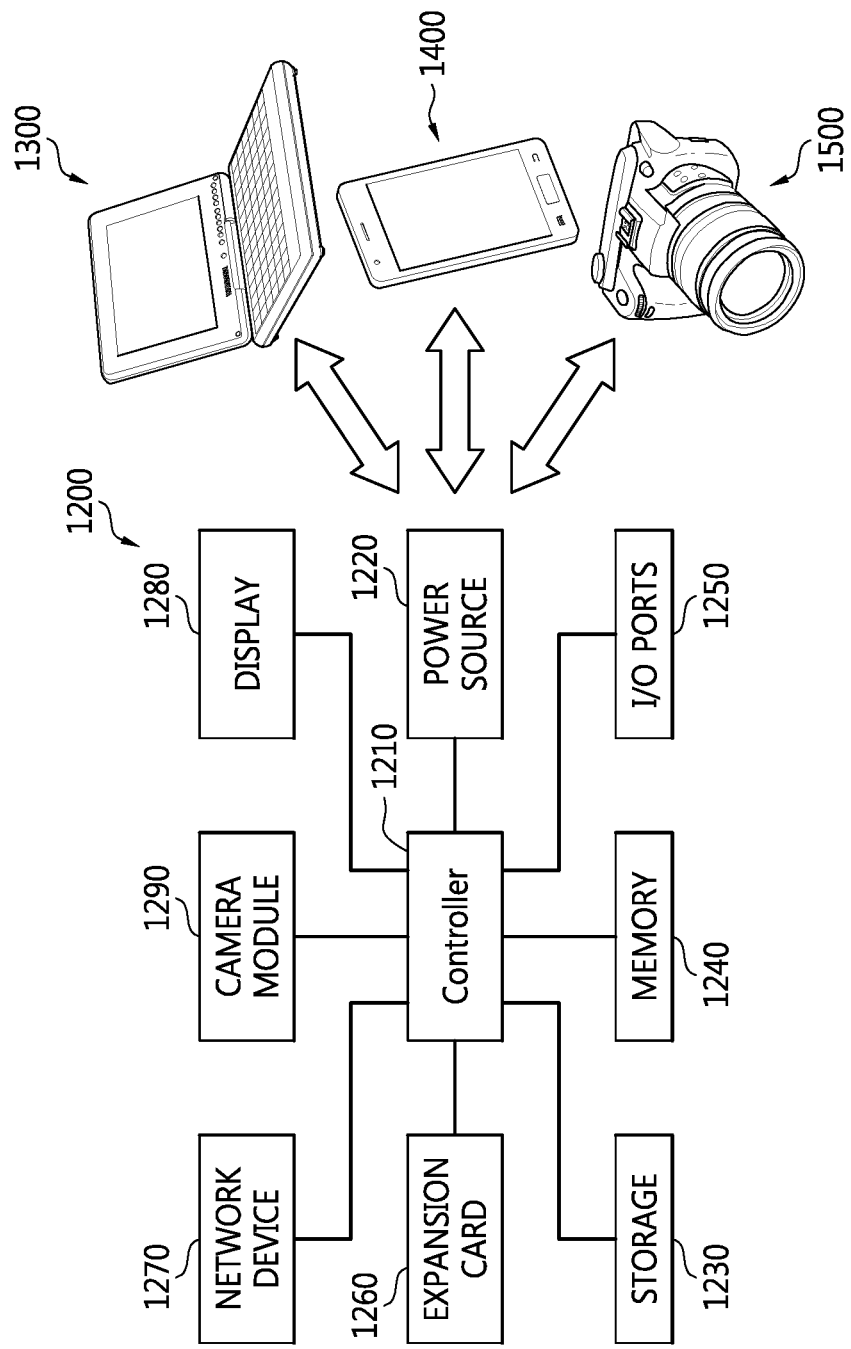

APPLICATION PROCESSOR AND SYSTEM ON CHIP

CROSS-REFERENCE TO RELATED APPLICATION

This application claims priority from Korean Patent Application No. 10-2015-0060581, filed on Apr. 29, 2015, the disclosure of which is incorporated herein in its entirety by reference.

BACKGROUND

Apparatuses consistent with exemplary embodiments relate to an application processor, and more particularly, to an application processor including a scheduler which checks the status of a core, a system on chip (SoC) including the scheduler which checks the status of the core, and a computing apparatus including the SoC.

Recently, microprocessors may include a plurality of cores. In particular, an application processor used in a mobile computing apparatus having limited power supply uses heterogeneous multi-processor (HMP) architecture to be flexible in responding to requirements of high performance and low power. The HMP architecture controls the level of an operating voltage of a core and/or the frequency of a clock signal for the core to reduce power consumption during the idle time of the core.

In the HMP architecture including a low-performance low-power core and a high-performance high-power core, the high-performance high-power core is shut off from the operating voltage and the clock signal most of the time. When a task which has been executed in the low-performance low-power core is migrated to the high-performance high-power core due to an increase in a workload of the task, a scheduler which migrates the task cannot check the status of the high-performance high-power core, and therefore, the task falls into a standby mode until the high-performance high-power core, which has been shut off from the operating voltage and the clock signal, becomes operable. As a result, the performance is deteriorated.

SUMMARY

According to an aspect of an exemplary embodiment, there is provided an application processor including: a first core and a second core, wherein the first core is configured to implement a scheduler which monitors a workload of a task of the first core, and the first core is further configured to implement an idle checker which determines whether the second core is idle.

The scheduler may call the idle checker via a first application programming interface (API), and the idle checker, which has been called, may determine whether the second core is idle using a second API and send a result of determining whether the second core is idle to the scheduler via the first API.

The idle checker may send an interrupt to the second core in response to determining that the second core is idle, and send a migration trigger signal to the scheduler via the first API, in response to determining that the second core is in a wake-up status, to trigger migration of the task to the second core.

The idle checker may prevent the second core, which has been woken up in response to the interrupt, from reentering an idle status.

The scheduler may include a call program for calling the idle checker via the first API.

The call program may include a migration checker which determines whether to migrate the task to the second core.

The first core and the second core may be heterogeneous processor cores.

According to an aspect of an exemplary embodiment, there is provided a system on chip, including: a first cluster, the first cluster including a first cache and a first core; a second cluster, the second cluster including a second cache and a second core; an interface connected between the first cache and the second cache; and a memory configured to store a scheduler, which determines a workload of a task of the first core, and an idle checker which determines whether the second core is idle, wherein, when the scheduler and the idle checker stored in the memory are implemented by the first core, the scheduler calls the idle checker via a first application programming interface (API).

The idle checker, which has been called, may determine whether the second core is idle using a second API and send a result of determining whether the second core is idle to the scheduler via the first API.

The idle checker may send an interrupt to the second core in response to determining that the second core is idle and send a migration trigger signal to the scheduler via the first API in response to determining that the second core is in a wake-up status.

The idle checker may prevent the second core, which has been woken up in response to the interrupt, from reentering an idle status.

The system on chip may further include an interrupt controller configured to send the interrupt to the second core based on a control signal output from the idle checker.

The scheduler may include a call program for calling the idle checker via the first API.

The call program may include a migrator which migrates the task to the second core in response to the migration trigger signal.

The first core and the second core may be heterogeneous processor cores.

According to an aspect of an exemplary embodiment, there is provided a computing apparatus including: at least one memory operable to store program code; and at least one processor operable to read the program code and configured to operate as instructed by the program code, the at least one processor including: a first cluster, the first cluster including a first cache and a first core; and a second cluster, the second cluster including a second cache and a second core, the first cache being connected to the second cache via an interface, wherein the program code causes the at least one processor to determine whether to transition a task from the first core to the second core based on a workload of the task, and wherein, in response to determining that the task is to be transitioned from the first core to the second core, the program code causes the at least one processor to control such that the second core remains in a wake-up status before the task is transitioned to the second core.

The program code may cause the at least one processor to transition the task to the second core, upon receiving a control signal indicating that the second core is in the wake-up status.

The program code may cause the at least one processor to determine whether the second core is in an idle status, wake up the second core in response to determining that the second core is in the idle status, and after the second core is woken up, prevent the second core from reentering the idle status.

The program code may cause the at least one processor to monitor the workload of the task at regular intervals, and wherein, in response to determining that the task is to be transitioned from the first core to the second core at a current interval and it is determined that the second core is in the idle status, the program code causes the at least one processor to migrate the task to the second core at a next interval after the second core is woken up.

The program code may cause the at least one processor to determine whether the second cluster in which the second core is included is in the wake-up status and, in response to determining that the second cluster is in the wake-up status, transition the task from the first core to the second core.

BRIEF DESCRIPTION OF THE DRAWINGS

The above and/or other aspects will be more apparent by describing certain example embodiments with reference to the accompanying drawings in which:

FIG. 17 is a schematic block diagram of an electronic system according to an exemplary embodiment.

DETAILED DESCRIPTION

Figure 1:
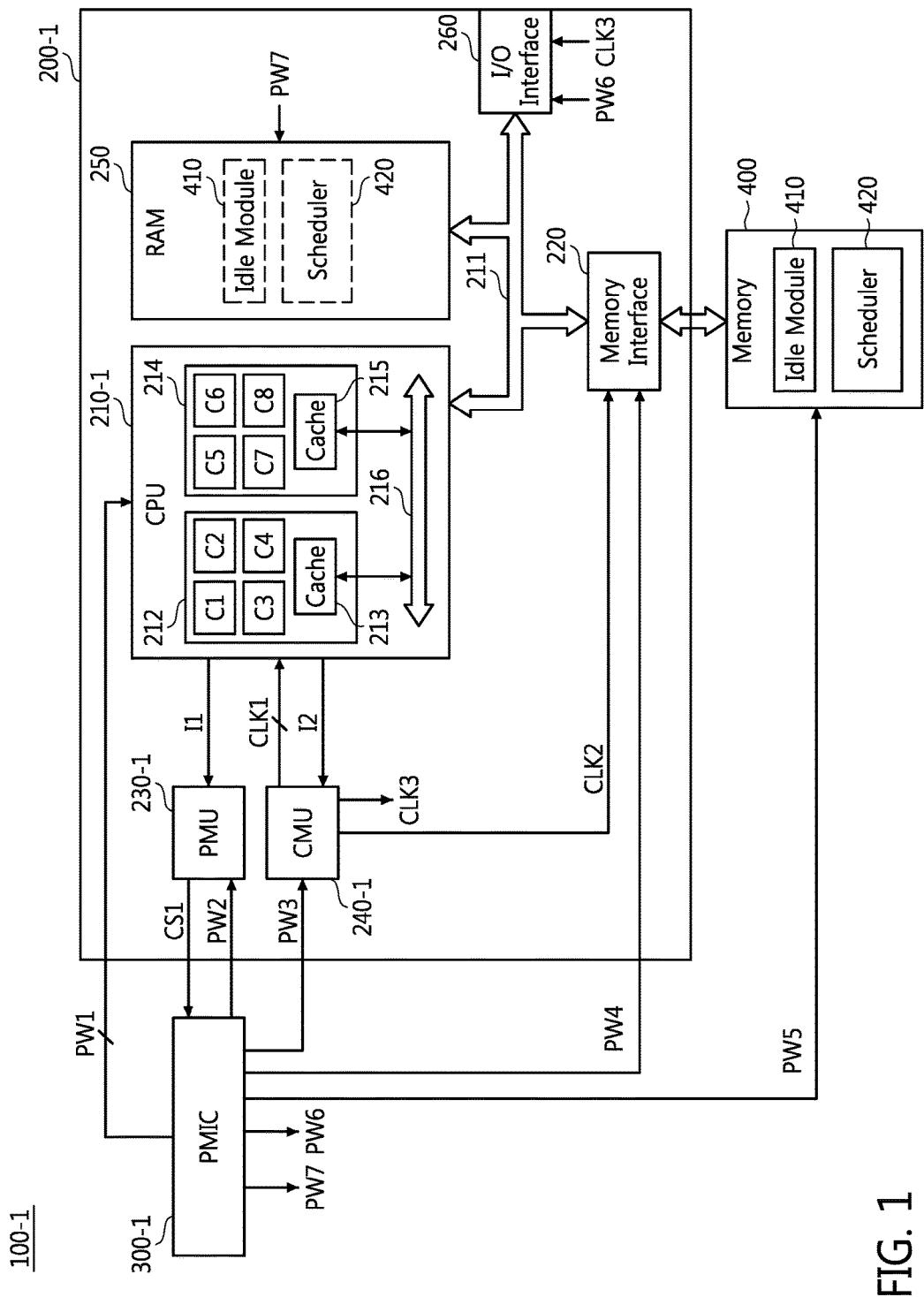
FIG. 1 is a schematic block diagram of a computing apparatus according to an exemplary embodiment.

The inventive concept now will be described more fully hereinafter with reference to the accompanying drawings, in which exemplary embodiments are shown. The inventive concept may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a computing apparatus 100-1 according to an exemplary embodiment. The computing apparatus 100-1 may include a controller 200-1, a power management integrated circuit (PMIC) 300-1, and a memory 400. The computing apparatus 100-1 may be a personal computer (PC) or a mobile computing apparatus. The mobile computing apparatus may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The controller 200-1 may control the operations of the PMIC 300-1 and the memory 400. The controller 200-1 may be implemented as a host, an integrated circuit (IC), a motherboard, a system on chip (SoC), an application processor (AP), or a mobile AP. When the controller 200-1 is implemented in a first package including an SoC, an AP, or a mobile AP and the memory 400 is implemented in a second package, the second package may be stacked over the first package using stack balls. The controller 200-1 may include a central processing unit (CPU) 210-1, bus architecture 211, a memory interface 220, a power management unit (PMU) 230-1, a clock management unit (CMU) 240-1, an internal memory 250, and an input/output (I/O) interface 260.

The CPU 210-1 may be a multi-core processor including a plurality of cores C1 through C8. Although the CPU 210-1 includes eight cores C1 through C8 in the exemplary embodiment illustrated in FIG. 1, the number of cores may vary depending on embodiments.

The cores C1 through C8 may be homogeneous or heterogeneous processor cores. The CPU 210-1 may be implemented as a heterogeneous multi-core processor (HMP). When it is assumed that the first through fourth cores C1 through C4 are low-performance low-power cores, the first through fourth cores C1 through C4 may be included in a first cluster 212. When it is assumed that the fifth through eighth cores C5 through C8 are high-performance high-power cores, the fifth through eighth cores C5 through C8 may be included in a second cluster 214.

The cores C1 through C8 may operate independently from one another. For instance, when the first core C1 is in a wake-up status, the fifth core C5 may be in an idle status. The wake-up status is a status in which a core is executing a task or is ready to execute a task upon being assigned the task. In other words, the wake-up status is a status in which the level of a power supplied to the core is at least a reference level and/or the frequency of a clock signal applied to the core is at least a reference frequency. The idle status is a status in which a core cannot operate immediately when it is assigned a task. In other words, the idle status is a status in which the level of the power supplied to the core is lower than the reference level and/or the frequency of the clock signal applied to the core is lower than the reference frequency.

When a core is assigned a task in an idle status, the PMU 230-1 may raise the level of a power supplied to the core to at least the reference level and the CMU 240-1 may raise the frequency of the clock signal to at least the reference frequency. Until the level of the power reaches the reference level, the task cannot be executed by the core and thus falls into a standby status.

The first cluster 212 and the second cluster 214 may operate independently from each other. For instance, when the first cluster 212 is in the wake-up status, the second cluster 214 may be in the idle status. When the first cluster 212 is in the wake-up status, the first through fourth cores C1 through C4 in the first cluster 212 may be in either the wake-up status or the idle status. When the second cluster 214 is in the idle status, the fifth through eighth cores C5 through C8 in the second cluster 214 may be in the idle status.

Each of the cores C1 through C8 may execute at least one task. A scheduler 420, which can be executed in each of the cores C1 through C8, may monitor the workload of the task and may migrate the task to another core based on the monitoring result. The migration operation of the scheduler 420 will be described later with reference to FIGS. 3 through 12.

The first and second clusters 212 and 214 may also include cache memories 213 and 215, respectively. The cache memories 213 and 215 may be connected to each other via an interface 216. The interface 216 may be used for cache coherence between the cache memories 213 and 215. For the cache coherence, the interface 216 may operate to reconcile data stored in the first cache memory 213 with data stored in the second cache memory 215. In detail, when data stored in the first cache memory 213 is changed by one of the cores C1 through C4 in the first cluster 212, the interface 216 may snoop around the data and copy the changed data to the second cache memory 215, but the inventive concept is not restricted to this example.

The bus architecture 211 may be implemented as an advanced microcontroller bus architecture (AMBA), an advanced high-performance bus (AHB), an advanced peripheral bus (APB), an advanced extensible interface (AXI), an advanced system bus (ASB), or a combination thereof, but the inventive concept is not restricted to these examples.

The memory interface 220 may control a write or read operation on the memory 400 according to the control of the CPU 210-1. In detail, the memory interface 220 may control a write or read operation on the memory 400 based on a second frequency of a second clock signal CLK2 output from the CMU 240-1 and the level of a fourth power PW4 output from the PMIC 300-1. The second frequency of the second clock signal CLK2 and the level of the fourth power PW4 can be changed.

Although one memory interface 220 and one memory 400 are shown in FIG. 1, the memory interface 220 may be a set of different memory interfaces and the memory 400 may be a set of different memories. When the memory 400 is a set of a dynamic random access memory (DRAM) and a flash memory (e.g., NAND-type or NOR-type flash memory), the memory interface 220 may be a set of a DRAM controller and a flash memory controller, but the inventive concept is not restricted to this example.

The memory 400 may include a volatile memory and/or a non-volatile memory. The volatile memory may be a random access memory (RAM), a DRAM, a static RAM (SRAM), a synchronous DRAM (SDRAM), a thyristor RAM (T-RAM), a zero capacitor RAM (Z-RAM), or a twin transistor RAM (TTRAM). The non-volatile memory may be an electrically erasable programmable read-only memory (EEPROM), a flash memory, a magnetic RAM (MRAM), a spin-transfer torque MRAM, a ferroelectric RAM (FeRAM), a phase-change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory. Alternatively, the memory 400 may be implemented as a solid state drive or solid state disk (SSD), an embedded SSD (eSSD), a multimedia card (MMC), an embedded MMC (eMMC), or a universal flash storage (UFS), but the inventive concept is not restricted to these examples.

The memory 400 may store an idle module 410 and the scheduler 420. The idle module 410 and the scheduler 420 may be loaded from the memory 400 to the internal memory 250 when the computing apparatus 100-1 is booted. The operations of the idle module 410 and the scheduler 420 will be described in detail later with reference to FIGS. 3 through 12.

Figure 2:
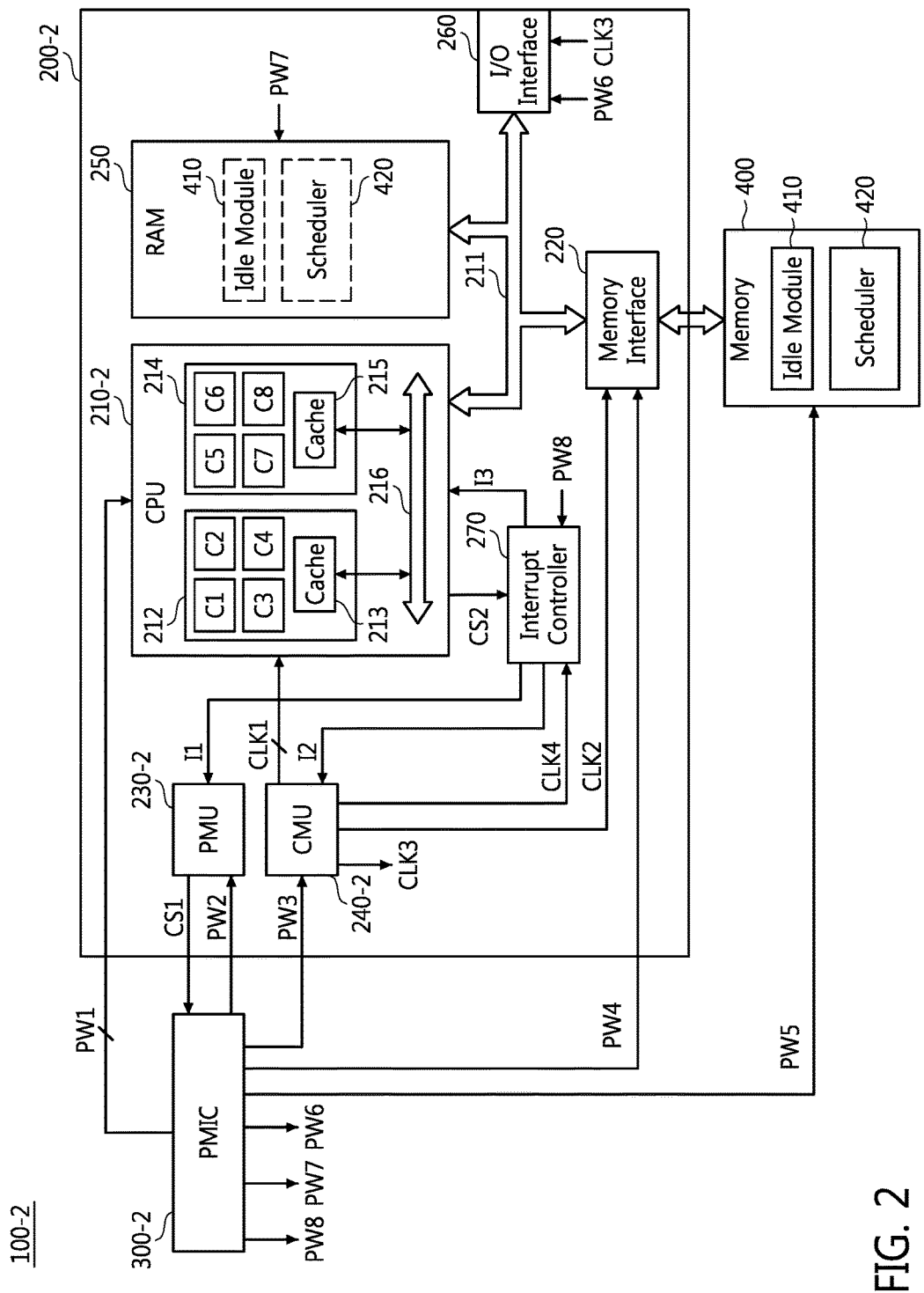
FIG. 2 is a schematic block diagram of a computing apparatus according to another exemplary embodiment.

The idle module 410 and the scheduler 420 are firmware or software stored in the memory 400 in the exemplary embodiments illustrated in FIGS. 1 and 2. However, the idle module 410 and the scheduler 420 may be implemented as hardware components in other exemplary embodiments. In this exemplary embodiment, the memory 400 may store firmware or software for controlling the operations of the idle module 410 and the scheduler 420.

The PMU 230-1 may generate a first control signal CS1 for controlling the operation of the PMIC 300-1 in response to a first interrupt I1 output from the CPU 210-1. Here, the first interrupt I1 may be a control signal for controlling the operation of the PMU 230-1.

The PMIC 300-1 may adjust the level of each of powers PW1 through PW7 in response to the first control signal CS1. In detail, in response to the first control signal CS1, the PMIC 300-1 may control the level of the first power PW1 supplied to the CPU 210-1, the level of the second power PW2 supplied to the PMU 230-1, the level of the third power PW3 supplied to the CMU 240-1, the level of the fourth power PW4 supplied to the memory interface 220, the level of the fifth power PW5 supplied to the memory 400, the level of the sixth power PW6 supplied to the I/O interface 260, and the level of the seventh power PW7 supplied to the internal memory 250. However, the inventive concept is not restricted to the current embodiments.

The first power PW1 may include a plurality of powers at different levels. The plurality of powers may be respectively applied to the first cluster 212, the second cluster 214, and the interface 216 included in the CPU 210-1. Alternatively, the plurality of powers may be respectively applied to the first through eighth cores C1 through C8 and the interface 216 included in the CPU 210-1.

The CMU 240-1 may adjust a first frequency of a first clock signal CLK1 applied to the CPU 210-1, the second frequency of the second clock signal CLK2 applied to the memory interface 220, and/or a third frequency of a third clock signal CLK3 applied to the I/O interface 260 in response to a second interrupt I2 output from the CPU 210-1. Here, adjusting may refer to raising, maintaining, or lowering. The second interrupt I2 may be a control signal for controlling the operation of the CMU 240-1.

The first clock signal CLK1 may include a plurality of clock signals, which may have different frequencies. The plurality of clock signals may be respectively applied to the first cluster 212, the second cluster 214, and the interface 216 included in the CPU 210-1. Alternatively, the plurality of clock signals may be respectively applied to the first through eighth cores C1 through C8 and the interface 216 included in the CPU 210-1.

The internal memory 250 may be an operation memory of the CPU 210-1. The internal memory 250 may be a read-only memory (ROM) or an SRAM but is not restricted thereto. When the memory 400 is a non-volatile memory and the computing apparatus 100-1 is booted, the idle module 410 and the scheduler 420 may be loaded from the memory 400 to the internal memory 250 and then executed by the CPU 210-1.

The I/O interface 260 is an interface for input/output of data. The I/O interface 260 may transmit or receive data based on the third clock signal CLK3 output from the CMU 240-1 and the sixth power PW6 output from the PMIC 300-1. The third frequency of the third clock signal CLK3 and the level of the sixth power PW6 may be changed.

The I/O interface 260 may be configured to support serial advanced technology attachment (SATA), an SATA express (SATAe), an SAS (serial attached small computer system interface (SCSI)), a peripheral component interconnect express (PCIe), or a mobile industry processor interface (MIPI®), but the inventive concept is not restricted to these examples.

FIG. 2 is a schematic block diagram of a computing apparatus 100-2 according to another exemplary embodiment. Referring to FIGS. 1 and 2, apart from an interrupt controller 270, the structure and operations of the computing apparatus 100-2 illustrated in FIG. 2 are substantially the same as or similar to those of the computing apparatus 100-1 illustrated in FIG. 1.

The interrupt controller 270 may send an interrupt to at least one among a PMU 230-2, a CMU 240-2, and a CPU 210-2 in response to a second control signal CS2 output from the CPU 210-2. In detail, the interrupt controller 270 may send the first interrupt I1 to the PMU 230-2, may send the second interrupt I2 to the CMU 240-2, or may send a third interrupt I3 to the CPU 210-2. The third interrupt I3 may be sent to the first cluster 212 and/or the second cluster 214 included in the CPU 210-2 or one of the first through eighth cores C1 through C8 included in the CPU 210-2.

The interrupt controller 270 may receive a fourth clock signal CLK4 having a fourth frequency from the CMU 240-2 and may receive an eighth power PW8 from the PMIC 300-2.

Figure 3:
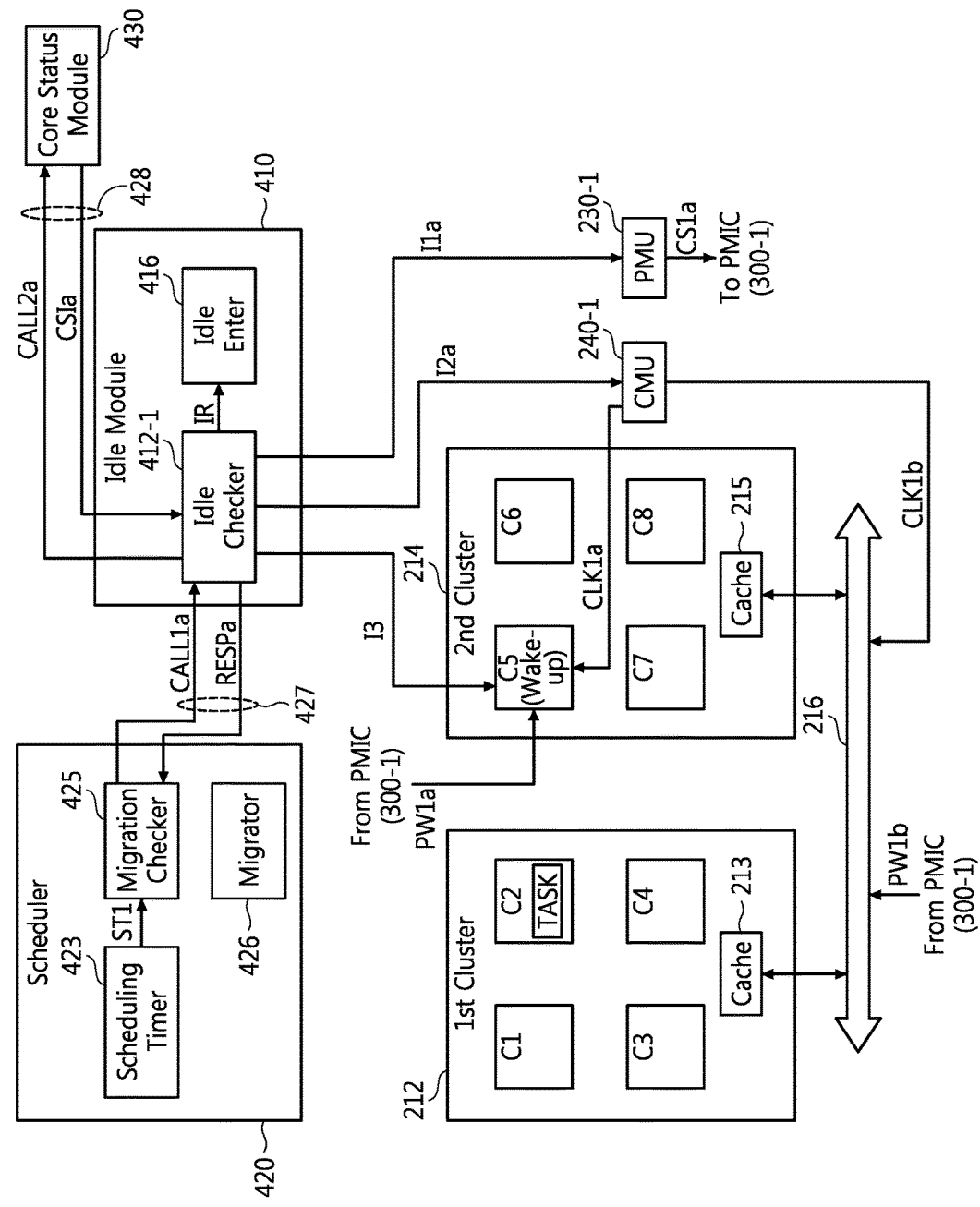
FIGS. 3 and 4 are block diagrams for explaining an operation of a controller illustrated in FIG. 1 according to exemplary embodiments.
Figure 4:
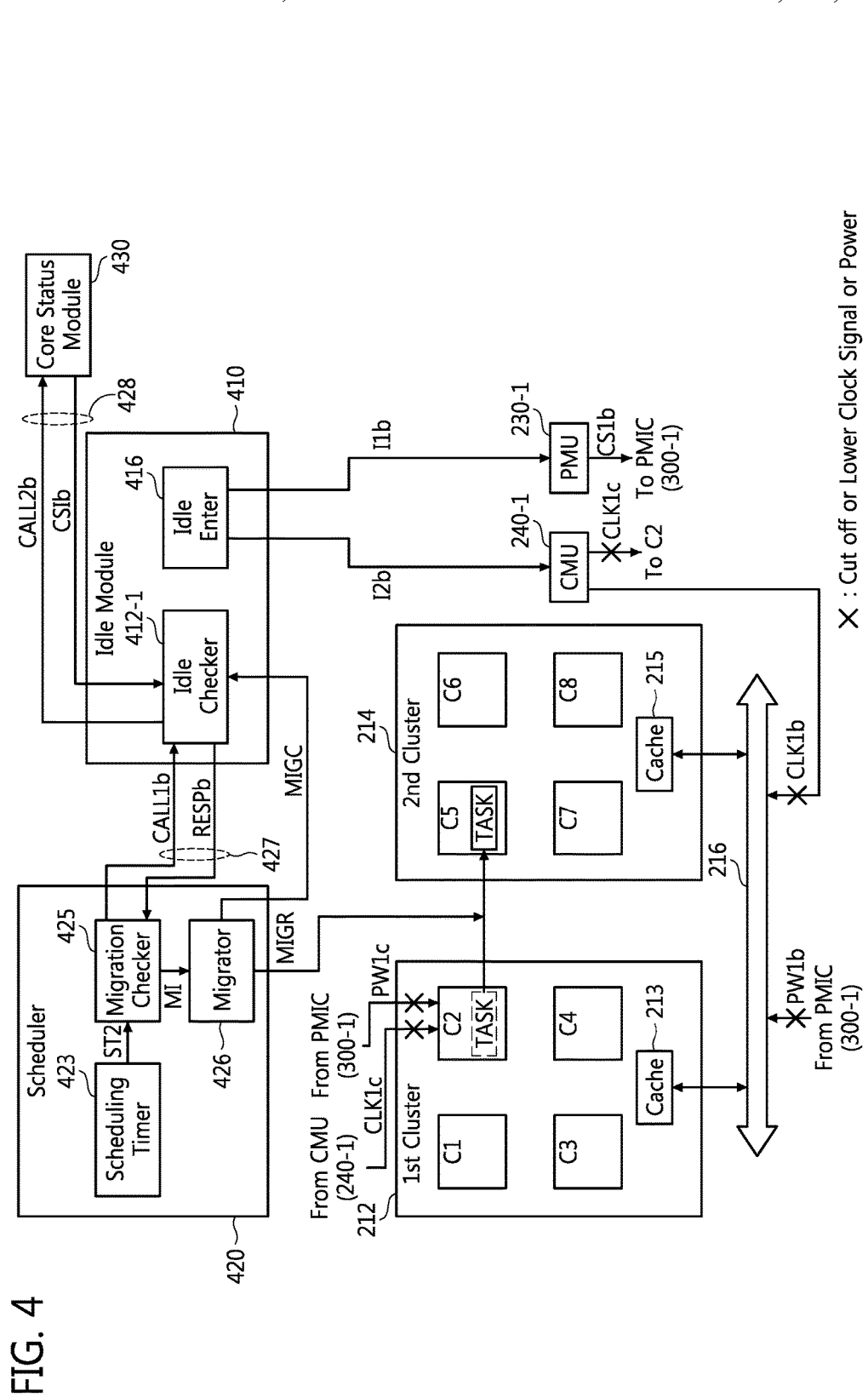

FIGS. 3 and 4 are block diagrams for explaining the operation of the controller 200-1 illustrated in FIG. 1 according to exemplary embodiments. FIGS. 3 and 4 show a case where each of the cores C1 through C8 in the CPU 210-1 enters an idle status or a wake-up status.

Hereinafter, the idle module 410 including an idle checker 412-1 and an idle enter 416, the scheduler 420 including a scheduling timer 423 and a migrator 426, a core status module 430, and a cluster status module 431 each refers to a computer program code or software which performs the function and operation corresponding to its name. However, the idle module 410, the scheduler 420, the core status module 430, and the cluster status module 431 may be implemented in hardware in other exemplary embodiments. In this exemplary embodiment, firmware or software needed for the operation of each of the idle module 410, the scheduler 420, the core status module 430, and the cluster status module 431 may be loaded from the memory 400 to the internal memory 250.

Although it is assumed that the idle module 410 and the scheduler 420 are executed in the second core C2 in the exemplary embodiments illustrated in FIGS. 3 through 12, the idle module 410 and the scheduler 420 may be executed in each of the cores C1 through C8.

Referring to FIGS. 1 and 3, the scheduling timer 423 included in the scheduler 420 may generate a scheduling tick ST1 at regular intervals and may send the scheduling tick ST1 to a migration checker 425. The migration checker 425 may monitor the workload of a task executed in the second core C2 in response to the scheduling tick ST1. In detail, the migration checker 425 may check whether the task is executed or in an idle status at the regular intervals. The migration checker 425 may determine the workload based on the execution or the idle status of the task and may determine, at the regular intervals, whether to migrate the task from the second core C2 to another core based on the workload of the task.

When it is assumed that the cores C1 through C4 included in the first cluster 212 are low-performance low-power cores and the cores C5 through C8 included in the second cluster 214 are high-performance high-power cores, the migration checker 425 may determine to migrate the task to one of the cores C5 through C8 included in the second cluster 214 when the workload is higher than a reference workload. Alternatively, when it is assumed that the cores C1 through C4 included in the first cluster 212 are high-performance high-power cores and the cores C5 through C8 included in the second cluster 214 are low-performance low-power cores, the migration checker 425 may determine to migrate the task to one of the cores C5 through C8 included in the second cluster 214 when the workload is lower than the reference workload.

The migration checker 425 may send a migration signal MI to the migrator 426 to migrate the task to the fifth core C5. Before sending the migration signal MI, the migration checker 425 may call (operation CALL1*a*) the idle checker 412-1 included in the idle module 410 via a first application programming interface (API) 427. In other words, the migration checker 425 may function as a call program for calling the idle checker 412-1.

The idle checker 412-1 called by the migration checker 425 may call (operation CALL2a) the core status module 430 via a second API 428 and may receive status information CSIa of the fifth core C5 from the core status module 430, which has been called, via the second API 428. The core status module 430 may be a PMU control module which includes power level information regarding each of the cores C1 through 8 and controls the PMU 230-1 and the status information CSIa may be the power level information regarding the fifth core C5. Alternatively, the core status module 430 may be a CMU control module which includes clock signal frequency information regarding each of the cores C1 through 8 and controls the CMU 240-1 and the status information CSIa may be the clock signal frequency information regarding the fifth core C5.

The idle checker 412-1 may check whether the fifth core C5 is idle (i.e., whether the fifth core C5 is in an idle status or a wake-up status) based on the status information CSIa and may send a check result to the migration checker 425 via the first API 427.

When the status information CSIa is the power level information regarding the fifth core C5, the idle checker 412-1 may compare the power level information with reference level information and may determine that the fifth core C5 is in the idle status when the power level information is lower than the reference level information. The idle checker 412-1 may determine that the fifth core C5 is in the wake-up status when the power level information is higher than the reference level information. Alternatively, various different methods of determining the status of the fifth core C5 using the idle checker 412-1 may be used.

When it is determined that the fifth core C5 is in the idle status, the idle checker 412-1 may send a response signal RESPa indicating that the fifth core C5 is in the idle status to the migration checker 425 and may wake up the fifth core C5. In detail, the idle checker 412-1 may send a first interrupt I1a to the PMU 230-1 so that power having at least the reference level is supplied to the fifth core C5 or may send a second interrupt I2a to the CMU 240-1 so that a clock signal having at least the reference frequency is applied to the fifth core C5.

The PMU 230-1 may send a first control signal CS1a to the PMIC 300-1 in response to the first interrupt I1a. The PMIC 300-1 may supply a power PW1a to the fifth core C5 and a power PW1b to the interface 216 in response to the first control signal CS1a. The CMU 240-1 may apply a clock signal CLK1a to the fifth core C5 and a clock signal CLK1b to the interface 216 in response to the second interrupt I2a.

The fifth core C5 may receive the power PW1a and/or the clock signal CLK1a and may receive the third interrupt I3 from the idle checker 412-1 and thus wake up. The interface 216 may receive the power PW1b and/or the clock signal CLK1b and operate. As the interface 216 operates, data related to the task stored in the first cache memory 213 may be moved or copied to the second cache memory 215.

The idle checker 412-1 may send an idle restriction signal IR to the idle enter 416 so that the fifth core C5 is prevented from reentering the idle status. The idle enter 416, which can place the fifth core C5 into the idle status, may not place the fifth core C5 into the idle status in response to the idle restriction signal IR. Although the idle checker 412-1 checks whether the fifth core C5 is idle and also sends the idle restriction signal IR to the idle enter 416 in the current embodiments, the idle checker 412-1 may be divided into a first module for checking whether a core is idle and a second module for sending the idle restriction signal IR in other exemplary embodiments.

The migration checker 425 may not migrate the task when the migration checker 425 receives the response signal RESPa indicating that the fifth core C5 is in the idle status. Accordingly, the task may be executed in the second core C2 until the scheduling timer 423 sends a next scheduling tick ST2. In other words, the scheduler 420 may check whether the fifth core C5 is idle using the idle checker 412-1 included in the idle module 410 and may not migrate the task to the fifth core C5 until the fifth core C5 wakes up. Although the idle checker 412-1 is included in the idle module 410 in the current embodiments, the idle checker 412-1 may be separately provided outside the idle module 410 in other embodiments.

Referring to FIG. 4, when the next scheduling tick ST2 is sent from the scheduling timer 423 to the migration checker 425 after the operations of the controller 200-1 illustrated in FIG. 3 are completed, the migration checker 425 may call (operation CALL1b) the idle checker 412-1. The idle checker 412-1 may call (operation CALL2b) the core status module 430 and may receive status information CSIb of the fifth core C5. The idle checker 412-1 may check whether the fifth core C5 is idle based on the status information CSIb and may send a check result to the migration checker 425.

Since the fifth core C5 is in the wake-up status and the idle enter 416 prevents the fifth core C5 from being idle in response to the idle restriction signal IR in the operations illustrated in FIG. 3, the idle checker 412-1 may send a response signal or a migration trigger signal RESPb instructing to migrate the task to the fifth core C5 to the migration checker 425. The migration checker 425 may generate the migration signal MI to the migrator 426 in response to the migration trigger signal RESPb to migrate the task to the fifth core C5 and may send the migration signal MI to the migrator 426.

The migrator 426 may migrate (operation MIGR) the task to the fifth core C5 in response to the migration signal MI. After the migration (operation MIGR) is completed, the migrator 426 may send a migration completion signal MIGC to the idle checker 412-1. The idle checker 412-1 may not output the idle restriction signal IR any more in response to the migration completion signal MIGC.

When there is no task to be executed in the second core C2, the idle module 410 may place the second core C2 into the idle status. The idle enter 416 may send a first interrupt I1b to the PMU 230-1 or a second interrupt I2b to the CMU 240-1.

The PMU 230-1 may send a first control signal CS1b to the PMIC 300-1 in response to the first interrupt I1b. The PMIC 300-1 may cut off a power PW1c supplied to the second core C2 or lower the level of the power PW1c below the reference level in response to the first control signal CS1b. The PMIC 300-1 may also cut off the power PW1b supplied to the interface 216 in response to the first control signal CS1b.

The CMU 240-1 may cut off a clock signal CLK1c applied to the second core C2 or lower the frequency of the clock signal CLK1c below the reference frequency in response to the second interrupt I2b. The CMU 240-1 may also cut off the clock signal CLK1b applied to the interface 216. The power PW1c and/or the clock signal CLK1c are adjusted so that the second core C2 may become idle.

Figure 5:
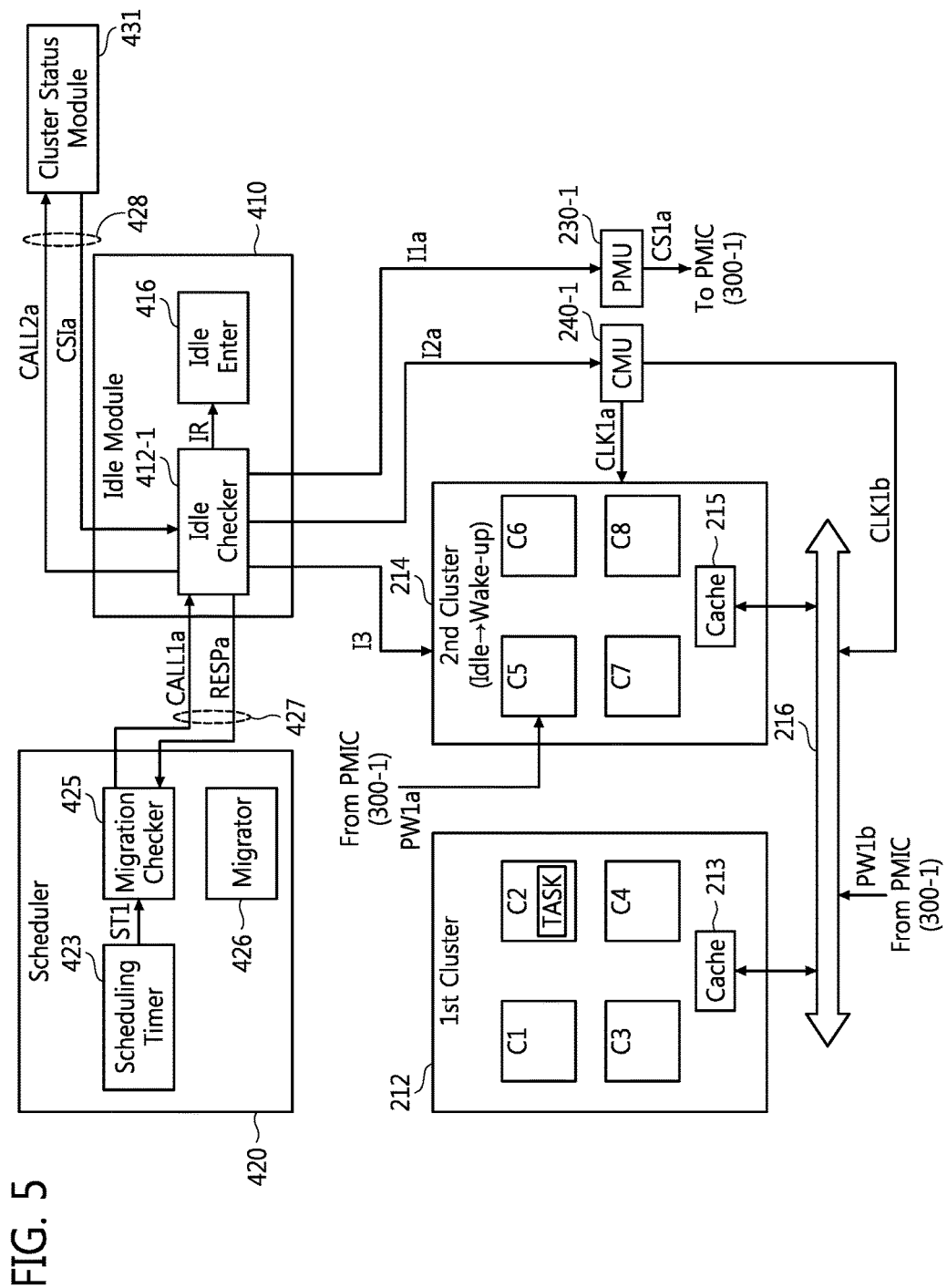
FIGS. 5 and 6 are block diagrams for explaining operation of the controller illustrated in FIG. 1 according to other exemplary embodiments.
Figure 6:
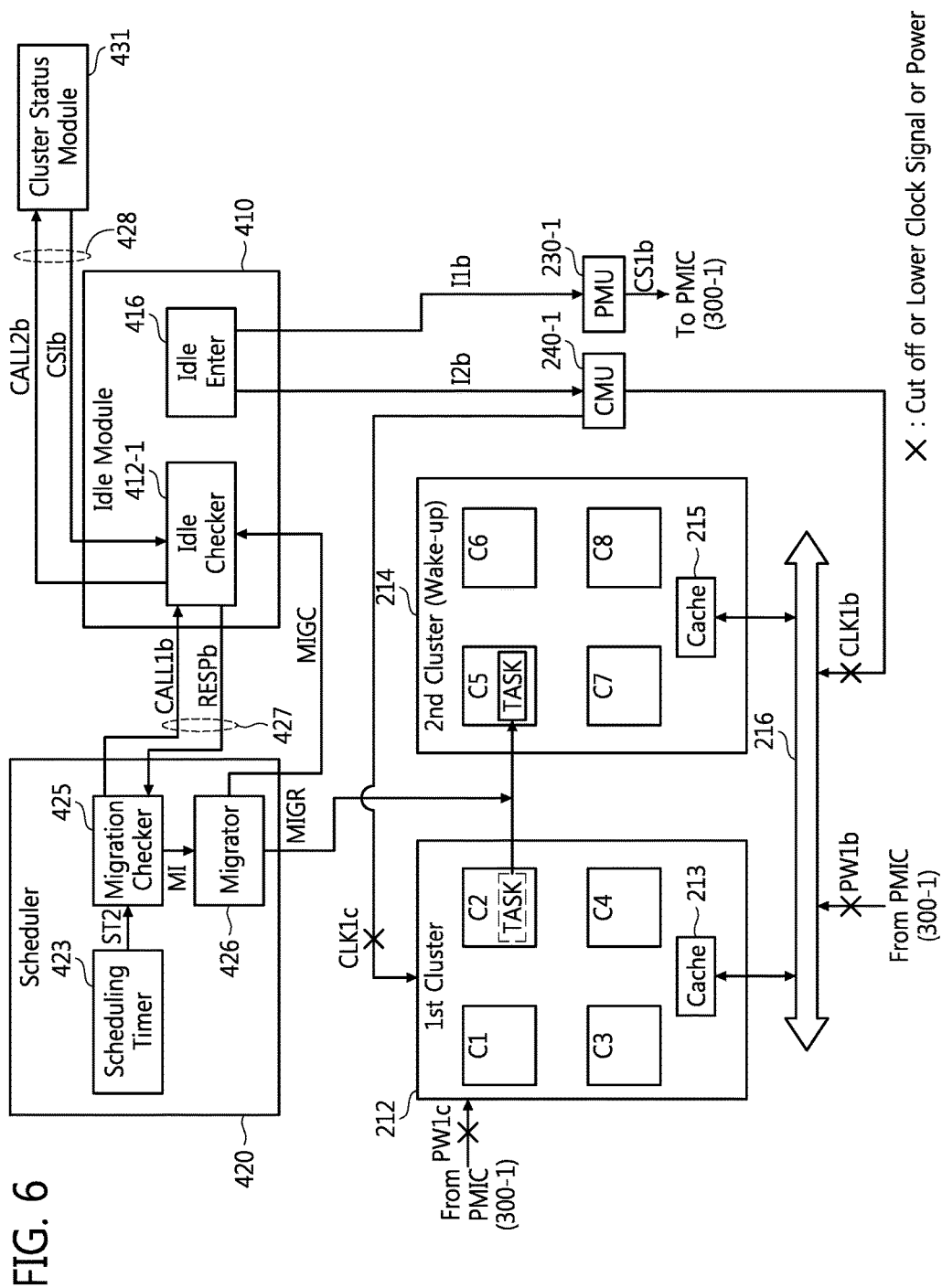

FIGS. 5 and 6 are block diagrams for explaining the operation of the controller 200-1 illustrated in FIG. 1 according to other exemplary embodiments. FIGS. 5 and 6 show a case where each of the first and second clusters 212 and 214 in the CPU 210-1 enters the idle status or the wake-up status.

Referring to FIGS. 1, 3, and 5, the migration checker 425 may monitor the workload of a task executed in the second core C2 in response to the scheduling tick ST1 output from the scheduling timer 423. The migration checker 425 may determine the workload based on whether the task is executed or is in the idle status and may determine, at regular intervals, whether to migrate the task from the second core C2 to another core (e.g., the fifth core C5) based on the workload.

When it is assumed that the cores C1 through C4 included in the first cluster 212 are low-performance low-power cores and the cores C5 through C8 included in the second cluster 214 are high-performance high-power cores, the migration checker 425 may determine to migrate the task to one of the cores C5 through C8 included in the second cluster 214 when the workload is higher than the reference workload. Alternatively, when it is assumed that the cores C1 through C4 included in the first cluster 212 are high-performance high-power cores and the cores C5 through C8 included in the second cluster 214 are low-performance low-power cores, the migration checker 425 may determine to migrate the task to one of the cores C5 through C8 included in the second cluster 214 when the workload is lower than the reference workload.

Before migrating the task to the fifth core C5, the migration checker 425 may call (operation CALL1a) the idle checker 412-1 included in the idle module 410 via the first API 427. The idle checker 412-1 called by the migration checker 425 may call (operation CALL2a) the cluster status module 431 via the second API 428 and may receive status information CSIa of the second cluster 214 from the cluster status module 431, which has been called, via the second API 428. The cluster status module 431 may be a PMU control module which includes power level information regarding each of the first and second clusters 212 and 214 and controls the PMU 230-1 and the status information CSIa may be the power level information regarding the second cluster 214. Alternatively, the cluster status module 431 may be a CMU control module which includes clock signal frequency information regarding each of the clusters 212 and 214 and controls the CMU 240-1 and the status information CSIa may be the clock signal frequency information regarding the second cluster 214.

The idle checker 412-1 may check whether the second cluster 214 is idle based on the status information CSIa and may send a check result to the migration checker 425 via the first API 427. When it is determined that the second cluster 214 is in the idle status, the idle checker 412-1 may send the response signal RESPa indicating that the second cluster 214 is in the idle status to the migration checker 425 and may wake up the second cluster 214. In detail, the idle checker 412-1 may send the first interrupt I1a to the PMU 230-1 so that power having at least the reference level is supplied to the second cluster 214 or may send the second interrupt I2a to the CMU 240-1 so that a clock signal having at least the reference frequency is applied to the second cluster 214.

The PMU 230-1 may send the first control signal CS1a to the PMIC 300-1 in response to the first interrupt I1a. The PMIC 300-1 may supply the power PW1a to the second cluster 214 and the power PW1b to the interface 216 in response to the first control signal CS1a. The CMU 240-1 may apply the clock signal CLK1a to the second cluster 214 and the clock signal CLK1b to the interface 216 in response to the second interrupt I2a.

The second cluster 214 may receive the power PW1a and/or the clock signal CLK1a and may receive the third interrupt I3 from the idle checker 412-1 and thus wake up.

The interface 216 may receive the power PW1b and/or the clock signal CLK1b and operate. As the interface 216 operates, data related to the task and stored in the first cache memory 213 may be moved or copied to the second cache memory 215.

The idle checker 412-1 may send the idle restriction signal IR to the idle enter 416 so that the second cluster 214 is prevented from reentering the idle status. The idle enter 416, which can place the second cluster 214 into the idle status, may not place the second cluster 214 into the idle status in response to the idle restriction signal IR.

The migration checker 425 may not send the migration signal MI to the migrator 246 when the migration checker 425 receives the response signal RESPa indicating that the second cluster 214 is in the idle status. Accordingly, the task may be executed in the second core C2 until the scheduling timer 423 sends the next scheduling tick ST2. In other words, the scheduler 420 may check whether the fifth core C5 is idle using the idle checker 412-1 included in the idle module 410 and may not migrate the task to the fifth core C5 until the fifth core C5 wakes up.

Referring to FIG. 6, when the next scheduling tick ST2 is sent from the scheduling timer 423 to the migration checker 425 after the operations of the controller 200-1 illustrated in FIG. 5 are completed, the migration checker 425 may call (operation CALL1b) the idle checker 412-1. The idle checker 412-1 may call (operation CALL2b) the cluster status module 431 and may receive status information CSIb of the second cluster 214. The idle checker 412-1 may check whether the second cluster 214 is idle based on the status information CSIb and may send a check result to the migration checker 425.

Since the second cluster 214 is in the wake-up status and the idle enter 416 prevents the second cluster 214 from being idle in response to the idle restriction signal IR in the operations illustrated in FIG. 5, the idle checker 412-1 may send a response signal or the migration trigger signal RESPb instructing to migrate the task to the fifth core C5 to the migration checker 425. The migration checker 425 may send the migration signal MI to the migrator 426 in response to the migration trigger signal RESPb.

The migrator 426 may migrate (operation MIGR) the task to the fifth core C5 in response to the migration signal MI. After the migration (operation MIGR) is completed, the migrator 426 may send the migration completion signal MIGC to the idle checker 412-1. The idle checker 412-1 may not output the idle restriction signal IR any more in response to the migration completion signal MIGC.

When there is no task to be executed in any of the cores C1 through C4 in the first cluster 212, the idle module 410 may change the first cluster 212 into the idle status. The idle enter 416 may send the first interrupt I1b to the PMU 230-1 and/or the second interrupt I2b to the CMU 240-1.

The PMU 230-1 may send the first control signal CS1b to the PMIC 300-1 in response to the first interrupt I1b. The PMIC 300-1 may cut off the power PW1c supplied to the first cluster 212 or lower the level of the power PW1c below the reference level in response to the first control signal CS1b. The PMIC 300-1 may also cut off the power PW1b supplied to the interface 216 in response to the first control signal CS1b.

The CMU 240-1 may cut off the clock signal CLK1c applied to the first cluster 212 or lower the frequency of the clock signal CLK1c below the reference frequency in response to the second interrupt I2b. The CMU 240-1 may also cut off the clock signal CLK1b applied to the interface 216. The power PW1c and/or the clock signal CLK1c are adjusted so that the first cluster 212 may become idle.

Figure 7:
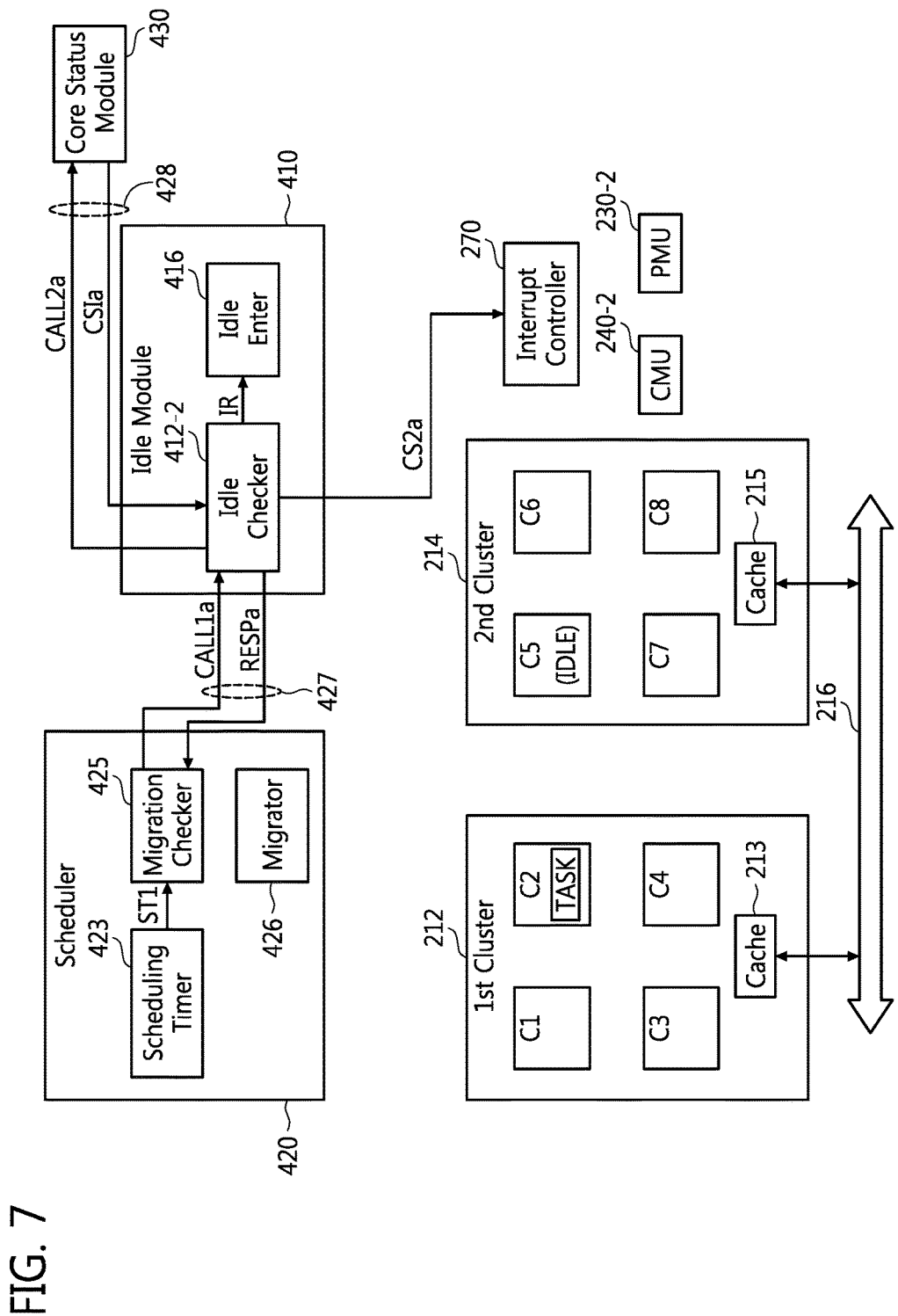
FIGS. 7 through 9 are block diagrams for explaining an operation of a controller illustrated in FIG. 2 according to exemplary embodiments.
Figure 8:
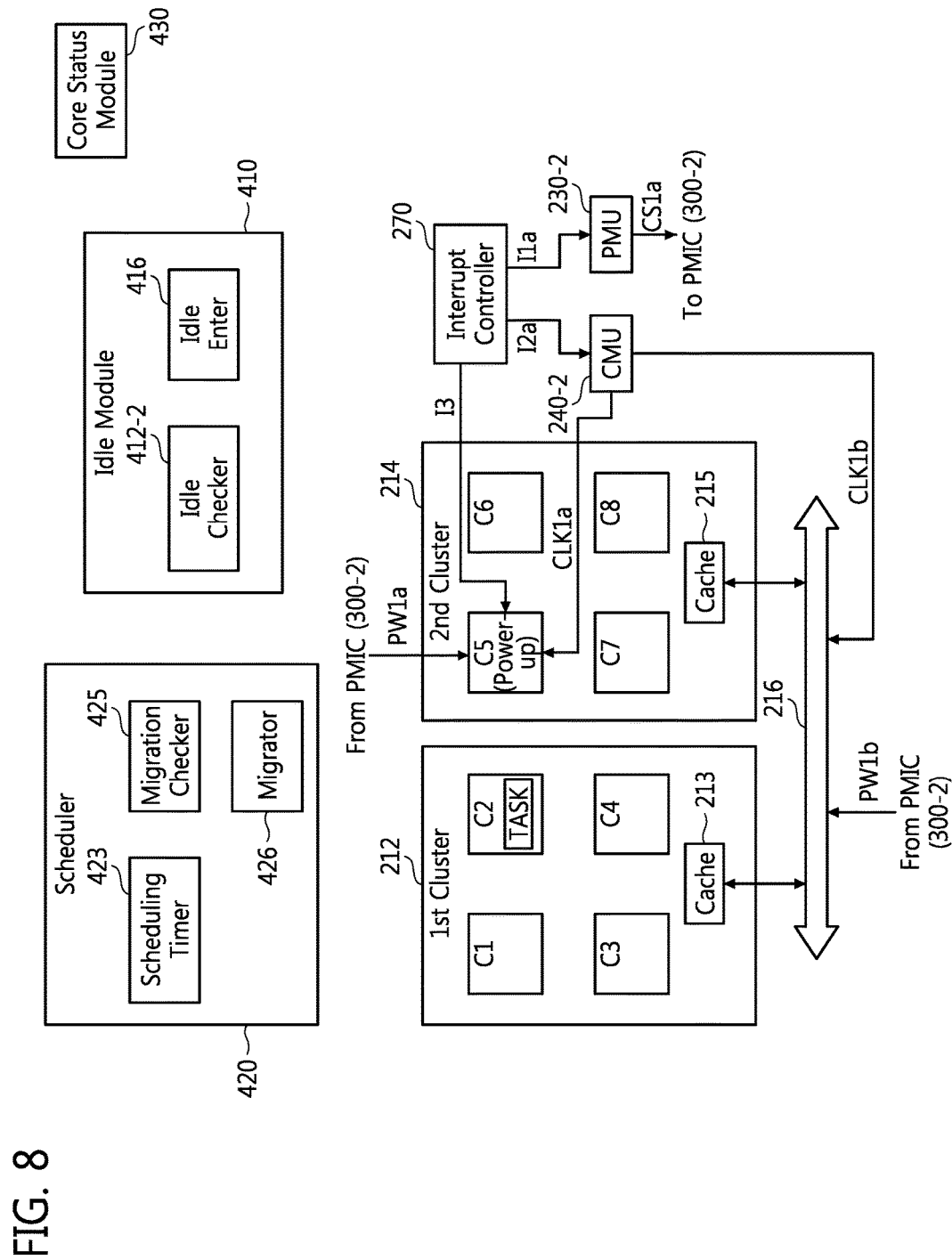
Figure 9:
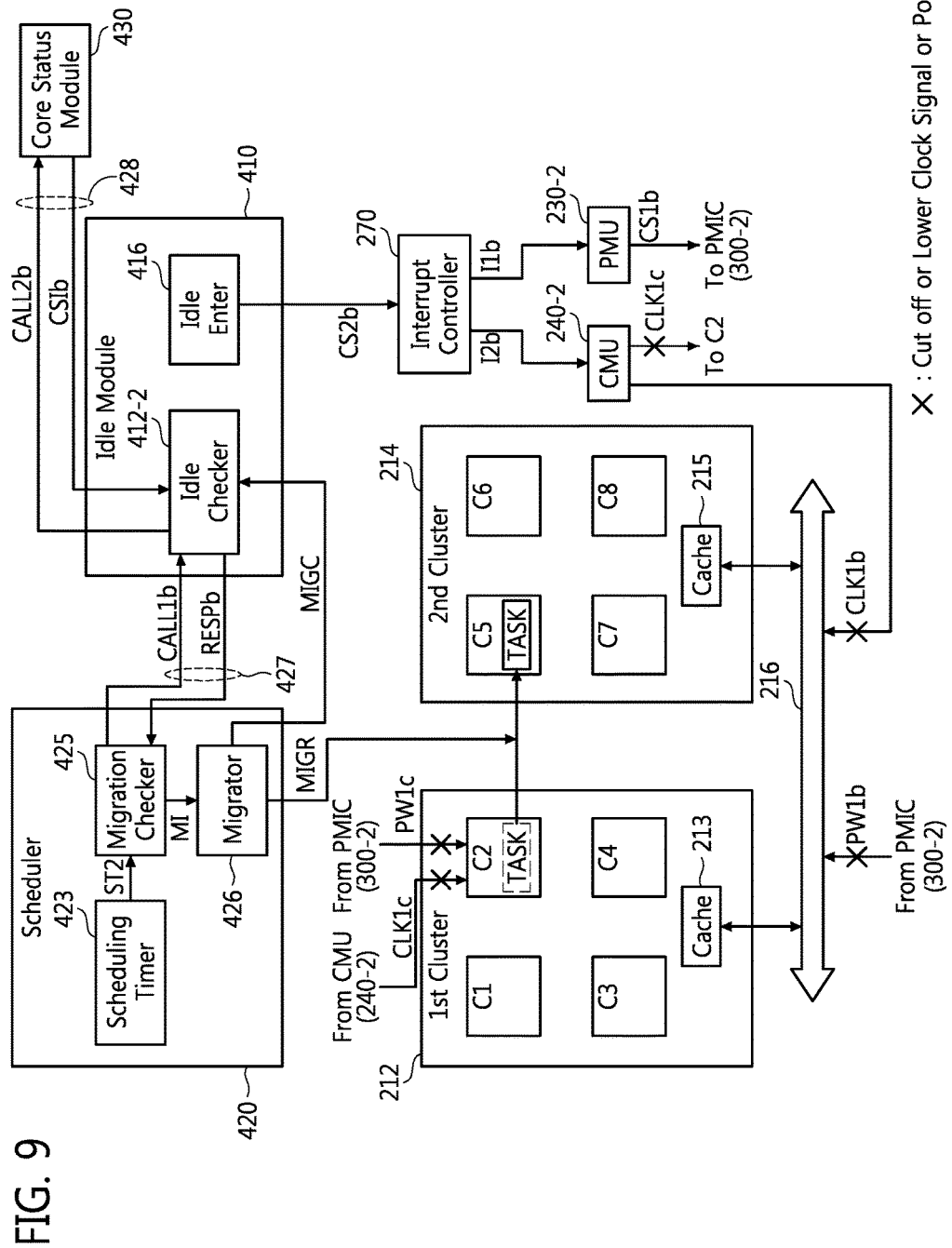

FIGS. 7 through 9 are block diagrams for explaining the operation of the controller 200-2 illustrated in FIG. 2 according to an exemplary embodiment. Referring to FIGS. 1 through 4 and FIG. 7, the operations of the scheduling timer 423, the migration checker 425, and the migrator 426 are substantially the same as those of the scheduling timer 423, the migration checker 425, and the migrator 426 illustrated in FIG. 3, and therefore, detailed descriptions thereof will be omitted.

The migration checker 425 may call (operation CALL1a) an idle checker 412-2 via the first API 427. The idle checker 412-2 may call (operation CALL2a) the core status module 430 via the second API 428 and may receive the status information CSIa regarding the fifth core C5. The idle checker 412-2 may check whether the fifth core C5 is idle based on the status information CSIa and may send a check result to the migration checker 425 via the first API 427.

When the fifth core C5 is idle, the idle checker 412-2 may send the response signal RESPa indicating that the fifth core C5 is idle and wake up the fifth core C5 to the migration checker 425. The idle checker 412-2 may send a second control signal CS2a for waking up the fifth core C5 to the interrupt controller 270.

The idle checker 412-2 may send the idle restriction signal IR to the idle enter 416 so that the fifth core C5 is prevented from reentering the idle status. The idle enter 416, which can place the fifth core C5 into the idle status, may not place the fifth core C5 into the idle status in response to the idle restriction signal IR.

Referring to FIG. 8, the interrupt controller 270 may send the first interrupt I1a to the PMU 230-2 and/or the second interrupt I2a to the CMU 240-2 in response to the second control signal CS2a.

The PMU 230-2 may send the first control signal CS1a to the PMIC 300-2 in response to the first interrupt I1a. The PMIC 300-2 may supply the power PW1a to the fifth core C5 and the power PW1b to the interface 216 in response to the first control signal CS1a. The CMU 240-2 may apply the clock signal CLK1a to the fifth core C5 and the clock signal CLK1b to the interface 216 in response to the second interrupt I2a.

The fifth core C5 may receive the power PW1a and/or the clock signal CLK1a and may receive the third interrupt I3 from the interrupt controller 270 and thus wake up. The interface 216 may receive the power PW1b and/or the clock signal CLK1b and operate. As the interface 216 operates, data related to the task and stored in the first cache memory 213 may be moved or copied to the second cache memory 215.

Referring to FIG. 9, when the next scheduling tick ST2 is sent from the scheduling timer 423 to the migration checker 425 after the operations of the controller 200-2 illustrated in FIGS. 7 and 8 are completed, the migration checker 425 may call (operation CALL1b) the idle checker 412-2. The idle checker 412-2 may call (operation CALL2b) the core status module 430 and may receive the status information CSIb of the fifth core C5. The idle checker 412-2 may check whether the fifth core C5 is idle based on the status information CSIb and may send a check result to the migration checker 425.

Since the fifth core C5 is in the wake-up status and the idle enter 416 prevents the fifth core C5 from being idle in response to the idle restriction signal IR in the operations illustrated in FIG. 8, the idle checker 412-2 may send the response signal or the migration trigger signal RESPb instructing to migrate the task to the fifth core C5 to the migration checker 425. The migration checker 425 may send the migration signal MI to the migrator 426 in response to the migration trigger signal RESPb and the migrator 426 may migrate (operation MIGR) the task to the fifth core C5. After the migration (operation MIGR) is completed, the migrator 426 may send the migration completion signal MIGC to the idle checker 412-2. The idle checker 412-2 may not output the idle restriction signal IR any more in response to the migration completion signal MIGC.

When there is no task to be executed in the second core C2, the idle module 410 may place the second core C2 into the idle status. The idle enter 416 may send a second control signal CS2b for placing the second core C2 into the idle status to the interrupt controller 270. The interrupt controller 270 may send the first interrupt I1b to the PMU 230-2 and/or the second interrupt I2b to the CMU 240-2 in response to the second control signal CS2b.

The PMU 230-2 may send the first control signal CS1b to the PMIC 300-2 in response to the first interrupt I1b. The PMIC 300-2 may cut off the power PW1c supplied to the second core C2 or lower the level of the power PW1c below the reference level in response to the first control signal CS1b. The PMIC 300-2 may also cut off the power PW1b supplied to the interface 216 in response to the first control signal CS1b.

The CMU 240-2 may cut off the clock signal CLK1c applied to the second core C2 or lower the frequency of the clock signal CLK1c below the reference frequency in response to the second interrupt I2b. The CMU 240-2 may also cut off the clock signal CLK1b applied to the interface 216. The power PW1c and/or the clock signal CLK1c are adjusted so that the second core C2 may become idle.

Figure 10:
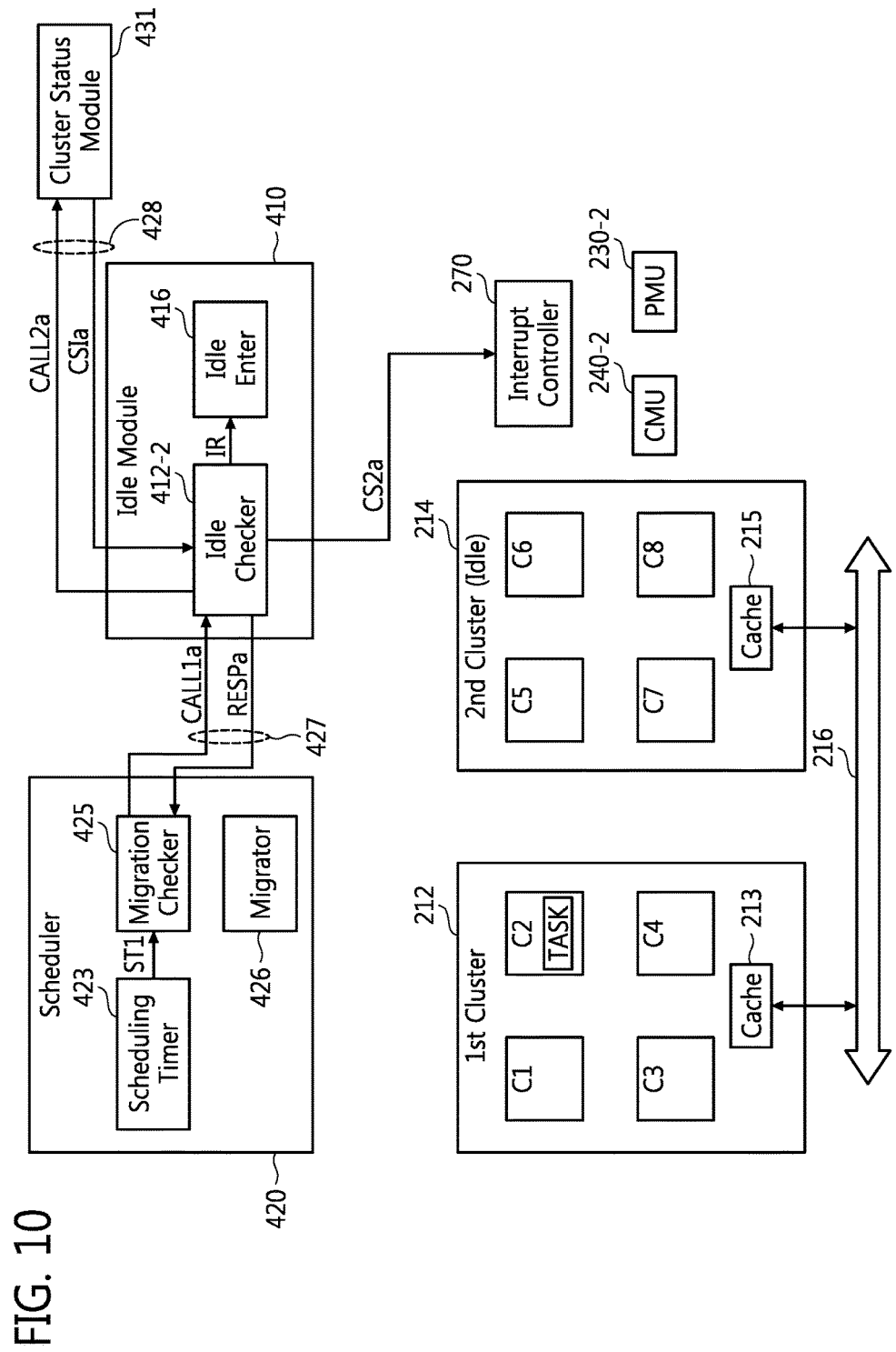
FIGS. 10 through 12 are block diagrams for explaining the operation of the controller illustrated in FIG. 2 according to other exemplary embodiments.
Figure 11:
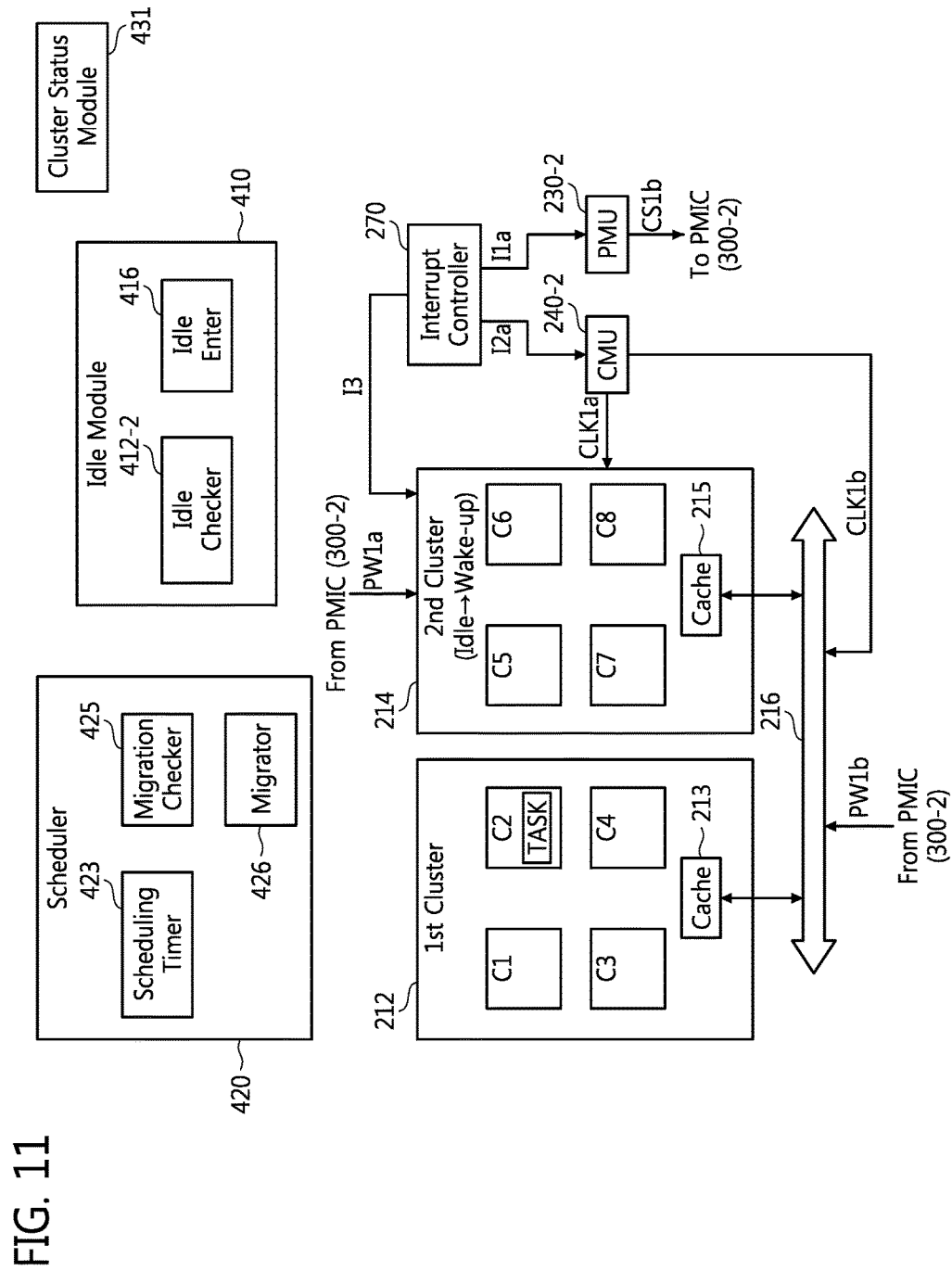
Figure 12:
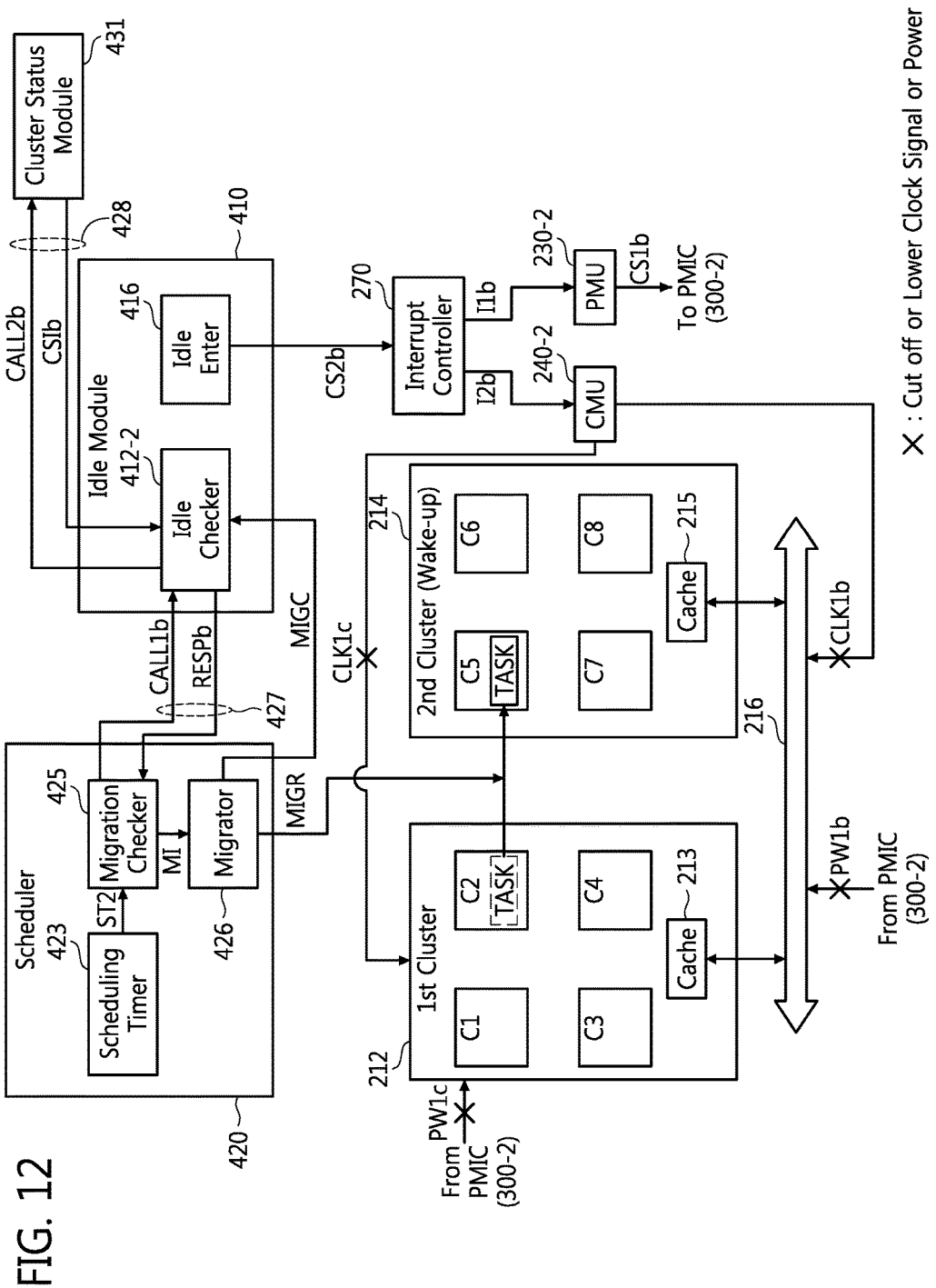

FIGS. 10 through 12 are block diagrams for explaining the operation of the controller 200-2 illustrated in FIG. 2 according to other exemplary embodiments. Referring to FIGS. 1 and 2, FIGS. 5 and 6, and FIG. 10, the operations of the scheduling timer 423, the migration checker 425, and the migrator 426 are substantially the same as those of the scheduling timer 423, the migration checker 425, and the migrator 426 illustrated in FIG. 5, and therefore, detailed descriptions thereof will be omitted.

The migration checker 425 may call (operation CALL1a) the idle checker 412-2 via the first API 427. The idle checker 412-2 may call (operation CALL2a) the cluster status module 431 via the second API 428. When receiving the status information CSIa of the second cluster 214 from the cluster status module 431, the idle checker 412-2 may check whether the second cluster 214 is idle based on the status information CSIa and may send a check result to the migration checker 425 via the first API 427.

When the second cluster 214 is idle, the idle checker 412-2 may send the migration checker 425 the response signal RESPa indicating that the second cluster 214 is idle and wake up the second cluster 214. The idle checker 412-2 may send the second control signal CS2a for waking up the second cluster 214 to the interrupt controller 270.

The idle checker 412-2 may send the idle restriction signal IR to the idle enter 416 so that the second cluster 214 is prevented from reentering the idle status. The idle enter 416, which can place the second cluster 214 into the idle status, may not place the second cluster 214 into the idle status in response to the idle restriction signal IR.

When receiving the response signal RESPa indicating that the second cluster 214 is idle, the migration checker 425 may not send the migration signal MI to the migrator 426. Accordingly, the task may be executed in the second core C2 until the migration checker 425 receives the next scheduling tick ST2 from the scheduling timer 423.

Referring to FIG. 11, the interrupt controller 270 may send the first interrupt I1a to the PMU 230-2 and/or the second interrupt I2a to the CMU 240-2 in response to the second control signal CS2a.

The PMU 230-2 may send the first control signal CS1b to the PMIC 300-2 in response to the first interrupt I1a. The PMIC 300-2 may supply the power PW1a to the second cluster 214 and the power PW1b to the interface 216 in response to the first control signal CS1a. The CMU 240-2 may apply the clock signal CLK1a to the second cluster 214 and the clock signal CLK1b to the interface 216 in response to the second interrupt I2a.

The second cluster 214 may receive the power PW1a and/or the clock signal CLK1a and may receive the third interrupt I3 from the interrupt controller 270 and thus wake up. The interface 216 may receive the power PW1b and/or the clock signal CLK1b and operate. As the interface 216 operates, data related to the task and stored in the first cache memory 213 may be moved or copied to the second cache memory 215.

Referring to FIG. 12, when the next scheduling tick ST2 is sent from the scheduling timer 423 to the migration checker 425 after the operations of the controller 200-2 illustrated in FIGS. 10 and 11 are completed, the migration checker 425 may call (operation CALL1b) the idle checker 412-2. The idle checker 412-2 may call (operation CALL2b) the cluster status module 431 and may receive the status information CSIb of the second cluster 214. The idle checker 412-2 may check whether the second cluster 214 is idle based on the status information CSIb and may send a check result to the migration checker 425.

Since the second cluster 214 is in the wake-up status and the idle enter 416 prevents the second cluster 214 from being idle in response to the idle restriction signal IR in the operations illustrated in FIG. 11, the idle checker 412-2 may send the response signal or the migration trigger signal RESPb instructing to migrate the task to the fifth core C5 to the migration checker 425. The migration checker 425 may send the migration signal MI to the migrator 426 in response to the migration trigger signal RESPb and the migrator 426 may migrate (operation MIGR) the task to the fifth core C5 in response to the migration signal MI. After the migration (operation MIGR) is completed, the migrator 426 may send the migration completion signal MIGC to the idle checker 412-2. The idle checker 412-2 may not output the idle restriction signal IR any more in response to the migration completion signal MIGC.

When there is no task to be executed in the cores C1 through C4 included in the first cluster 212, the idle module 410 may place the first cluster 212 into the idle status. The idle enter 416 may send the second control signal CS2b for placing the first cluster 212 into the idle status to the interrupt controller 270. The interrupt controller 270 may send the first interrupt I1b to the PMU 230-2 and/or the second interrupt I2b to the CMU 240-2 in response to the second control signal CS2b.

The PMU 230-2 may send the first control signal CS1b to the PMIC 300-2 in response to the first interrupt I1b. The PMIC 300-2 may cut off the power PW1c supplied to the first cluster 212 or lower the level of the power PW1c below the reference level in response to the first control signal CS1b. The PMIC 300-2 may also cut off the power PW1b supplied to the interface 216 in response to the first control signal CS1b.

The CMU 240-2 may cut off the clock signal CLK1c applied to the first cluster 212 or lower the frequency of the clock signal CLK1c below the reference frequency in response to the second interrupt I2b. The CMU 240-2 may also cut off the clock signal CLK1b applied to the interface 216. The power PW1c and/or the clock signal CLK1c are adjusted so that the first cluster 212 may become idle.

Figure 13:
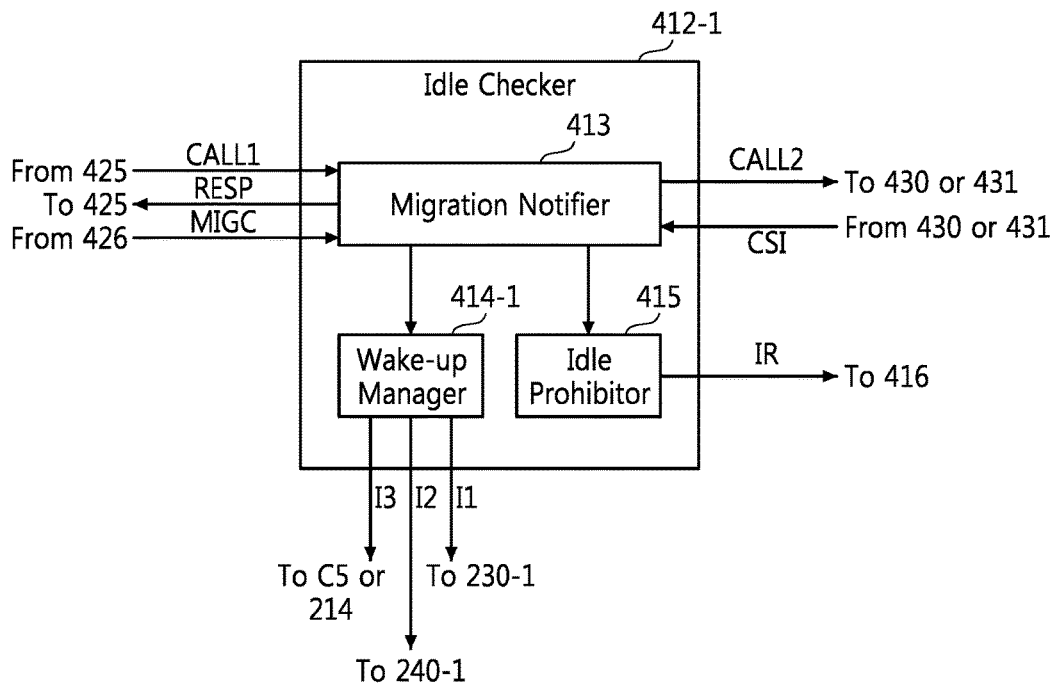
FIG. 13 is a block diagram of an idle checker illustrated in FIGS. 3 through 6 according to an exemplary embodiment.

FIG. 13 is a block diagram of the idle checker 412-1 illustrated in FIGS. 3 through 6 according to an exemplary embodiment. Referring to FIGS. 3 through 6 and FIG. 13, the idle checker 412-1 may include a migration notifier 413, a wake-up manager 414-1, and an idle prohibitor 415.

The migration notifier 413 may be called (operation CALL1) by the migration checker 425. Then, the migration notifier 413 may call (operation CALL2) the core status module 430 or the cluster status module 431 and receive a core status information or cluster status information CSI. The migration notifier 413 may send a response signal RESP to the migration checker 425 based on the core status information or cluster status information CSI. The response signal RESP may be the response signal RESPa indicating that a core or a cluster is idle or the migration trigger signal RESPb, as described above.

The migration notifier 413 may control the wake-up manager 414-1 to wake up the core or the cluster or place the core or the cluster into the idle status. The wake-up manager 414-1 may output the interrupts I1, I2, and I3 to the PMU 230-1, the CMU 240-1, and the core or the cluster, respectively.

The migration notifier 413 may also control the idle prohibitor 415 to output the idle restriction signal IR to the idle enter 416 so that the core or the cluster, which has been woken up, may not returned to the idle status. After migration is completed, the migration notifier 413 may control the idle prohibitor 415 not to output the idle restriction signal IR any more in response to the migration completion signal MIGC received from the migrator 426.

Figure 14:
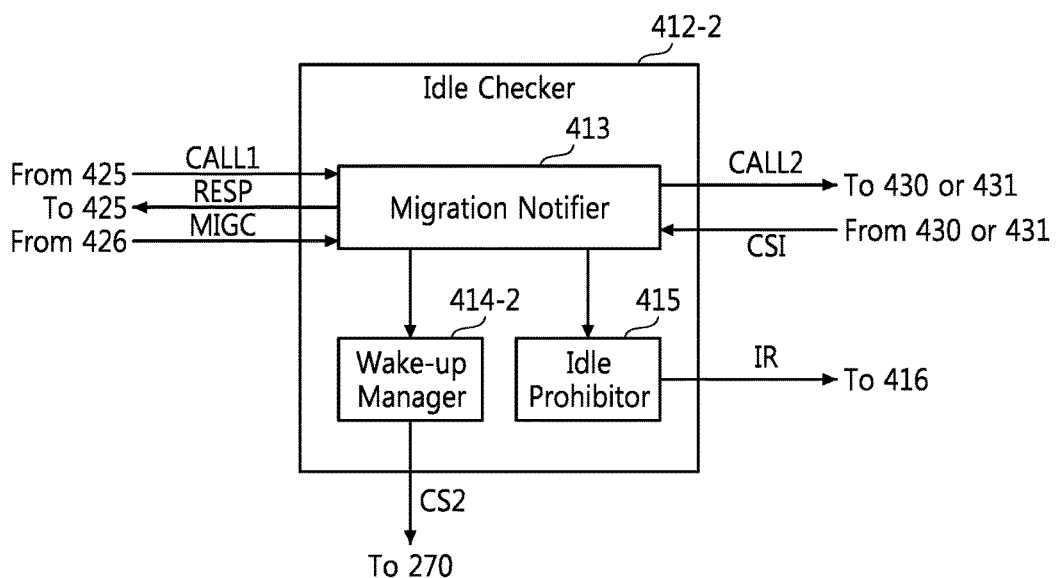
FIG. 14 is a block diagram of an idle checker illustrated in FIGS. 7 through 12 according to another exemplary embodiment.

FIG. 14 is a block diagram of the idle checker 412-2 illustrated in FIGS. 7 through 12 according to an exemplary embodiment. Referring to FIGS. 7 through 14, the structure and operations of the migration notifier 413 and the idle prohibitor 415 included in the idle checker 412-2 illustrated in FIG. 14 are substantially the same as those of the migration notifier 413 and the idle prohibitor 415 included in the idle checker 412-1 illustrated in FIG. 13, and therefore, detailed descriptions thereof will be omitted.

The migration notifier 413 may control the wake-up manager 414-2 to wake up the core or the cluster or place the core or the cluster into the idle status. The wake-up manager 414-2 may generate the second control signal CS2 for controlling the interrupt controller 270 and send the second control signal CS2 to the interrupt controller 270. The interrupt controller 270 may output an interrupt to at least one among the PMU 230-2, the CMU 240-2, and/or the core or the cluster based on the second control signal CS2.

Figure 15:
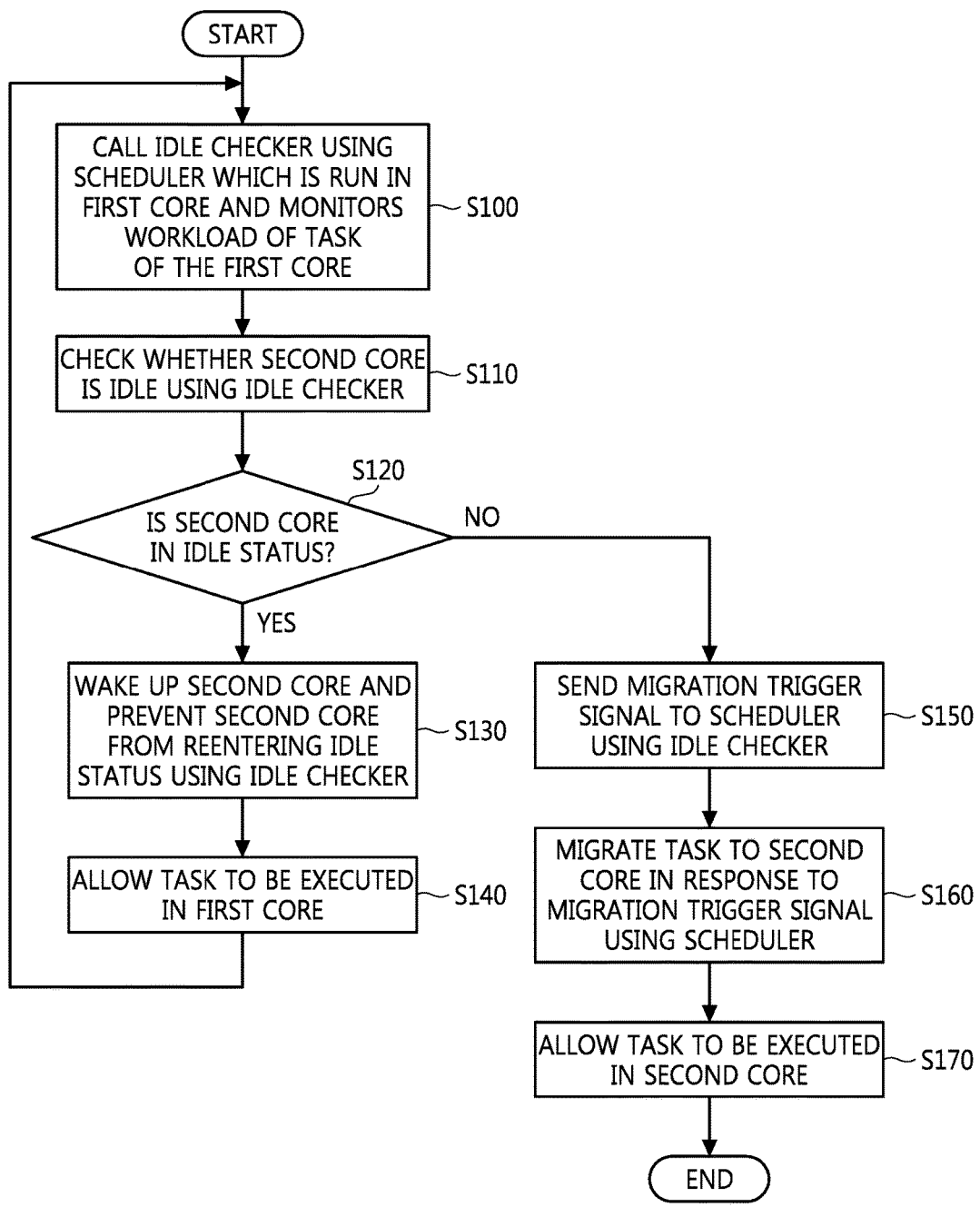
FIG. 15 is a flowchart of the operation of the controller illustrated in FIGS. 3 and 4 or FIGS. 7 through 9 according to an exemplary embodiment.
Figure 16:
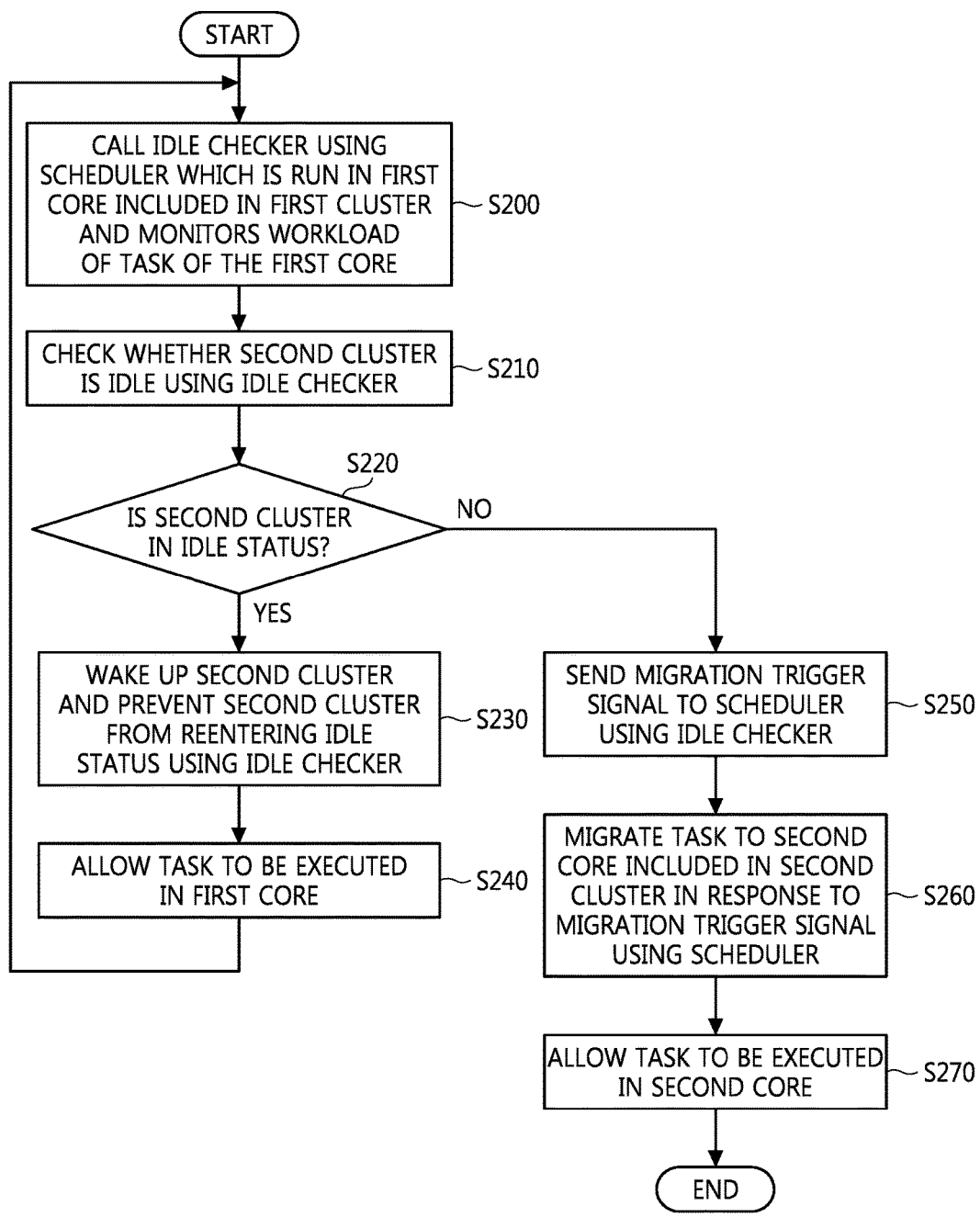
FIG. 16 is a flowchart of the operation of the controller illustrated in FIGS. 5 and 6 or FIGS. 10 through 12 according to an exemplary embodiment.

FIG. 15 is a flowchart of the operation of the controller 200-1 or 200-2 illustrated in FIGS. 3 and 4 or FIGS. 7 through 9 according to exemplary embodiments. In FIGS. 15 and 16, a first core may refer to the second core C2 illustrated in FIGS. 3 through 12 and a second core may refer to the fifth core C5 illustrated in FIGS. 3 through 12.

Referring to FIGS. 1 through 4, FIGS. 7 through 9, and FIG. 15, the scheduler 420, which is run in the first core (or second core C2) and which monitors the workload of the task executed in the first core (or second core C2), may call the idle checker 412-1 or 412-2 in operation S100. In detail, the migration checker 425 included in the scheduler 420 may call the idle checker 412-1 or 412-2 via the first API 427 to check the status of the second core (or fifth core C5) before the task is migrated to the second core (or fifth core C5).

The idle checker 412-1 or 412-2, which has been called, may call the core status module 430 via the second API 428 and may check whether the second core (or fifth core C5) is idle based on the status information CSIa or CSIb received from the core status module 430 in operation S110. The idle checker 412-1 or 412-2 may send the response signal RESPa or RESPb to the migration checker 425 via the first API 427 according to a result of checking whether the second core (or fifth core C5) is idle.

When it is determined that the second core (or fifth core C5) is in the idle status ("YES" in operation S120), the idle checker 412-1 or 412-2 may wake up the second core (or fifth core C5) and prevent the second core (or fifth core C5) from reentering the idle status in operation S130. The idle checker 412-1 or 412-2 may control the interrupt controller 270 to wake up the second core (or fifth core C5). The second core (or fifth core C5) may be woken up by being provided with the power PW1a having at least the reference level from the PMIC 300-1 or 300-2 or by being provided with the clock signal CLK1a having at least the reference frequency from the CMU 240-1 or 240-2. The idle checker 412-1 or 412-2 may send the idle restriction signal IR to the idle enter 416 to prevent the second core (or fifth core C5) from reentering the idle status and the idle enter 416 may not place the second core (or fifth core C5) into the idle status in response to the idle restriction signal IR.

When receiving the response signal RESPa indicating that the second core (or fifth core C5) is in the idle status, the migration checker 425 may not migrate the task to the second core (or fifth core C5) so that the task is executed in the first core (or second core C2) in operation S140.

When it is determined that the second core (or fifth core C5) is not in the idle status, that is, the second core (or fifth core C5) is in the wake-up status ("NO" in operation S120), the idle checker 412-1 or 412-2 may send the response signal or the migration trigger signal RESPb for migrating the task to the second core (or fifth core C5) to the migration checker 425 in operation S150. The migration checker 425 may send the migration signal MI for migrating the task to the second core (or fifth core C5) to the migrator 426 in response to the migration trigger signal RESPb and the migrator 426 may migrate (MIGR) the task to the second core (or fifth core C5) in response to the migration signal MI in operation S160. The task is executed in the second core (or fifth core C5) in operation S170.

FIG. 16 is a flowchart of the operation of the controller 200-1 or 200-2 illustrated in FIGS. 5 and 6 or FIGS. 10 through 12 according to an exemplary embodiment. Referring to FIGS. 1 and 2, FIGS. 5 and 6, FIGS. 10 through 12, and FIGS. 15 and 16, the scheduler 420, which is run in the first core (or second core C2) included in the first cluster 212 and which monitors the workload of the task executed in the first core (or second core C2), may call the idle checker 412-1 or 412-2 in operation S200. In detail, the migration checker 425 included in the scheduler 420 may call the idle checker 412-1 or 412-2 via the first API 427 to check the status of the second cluster 214 before the task is migrated to the second core (or fifth core C5).

The idle checker 412-1 or 412-2, which has been called, may call the cluster status module 431 via the second API 428 and may check whether the second cluster 214 is idle based on the status information CSIa or CSIb received from the cluster status module 431 in operation S210. The idle checker 412-1 or 412-2 may send the response signal RESPa or RESPb to the migration checker 425 via the first API 427 according to a result of checking whether the second cluster 214 is idle.

When it is determined that the second cluster 214 is in the idle status ("YES" in operation S220), the idle checker 412-1 or 412-2 may wake up the second cluster 214 and prevent the second cluster 214 from reentering the idle status in operation S230. The idle checker 412-1 or 412-2 may control the interrupt controller 270 to wake up the second cluster 214. The second cluster 214 may be woken up by being provided with the power PW1a having at least the reference level from the PMIC 300-1 or 300-2 or by being provided with the clock signal CLK1a having at least the reference frequency from the CMU 240-1 or 240-2. The idle checker 412-1 or 412-2 may send the idle restriction signal IR to the idle enter 416 to prevent the second cluster 214 from reentering the idle status and the idle enter 416 may not place the second cluster 214 into the idle status in response to the idle restriction signal IR.

When receiving the response signal RESPa indicating that the second cluster 214 is in the idle status, the migration checker 425 may not migrate the task to the second core (or fifth core C5) so that the task is executed in the first core (or second core C2) in operation S240.

When it is determined that the second cluster 214 is not in the idle status, that is, the second cluster 214 is in the wake-up status ("NO" in operation S220), the idle checker 412-1 or 412-2 may send the response signal or the migration trigger signal RESPb for migrating the task to the second core (or fifth core C5) to the migration checker 425 in operation S250. The migration checker 425 may send the migration signal MI to the migrator 426 in response to the migration trigger signal RESPb and the migrator 426 may migrate (MIGR) the task to the second core (or fifth core C5) in response to the migration signal MI in operation S260. The task is executed in the second core (or fifth core C5) in operation S270.

FIG. 17 is a schematic block diagram of an electronic system according to an exemplary embodiment. Referring to FIGS. 1 through 17, an electronic system 1200, 1300, 1400, or 1500 may be implemented as the computing apparatus 100-1 or 100-2 illustrated in FIG. 1 or 2. The electronic system 1200, 1300, 1400, or 1500 includes a controller 1210, a power source 1220, a storage 1230, a memory 1240, I/O ports 1250, an expansion card 1260, a network device 1270, and a display 1280. The electronic system 1200, 1300, 1400, or 1500 may also include a camera module 1290.

The controller 1210 may include to the controller 200-1 or 200-2 illustrated in FIG. 1 or 2. The controller 1210 may control the operation of each of the elements 1220 through 1280. The power source 1220 may supply an operating voltage to at least one of the elements 1210 and 1230 through 1280. The storage 1230 may be implemented as a hard disk drive (HDD) or an SSD.

The memory 1240 may be implemented as a volatile or non-volatile memory. A memory controller (not shown) that controls a data access operation, e.g., a read operation, a write operation (or a program operation), or an erase operation, on the memory 1240 may be integrated into or embedded in the controller 1210. Alternatively, the memory controller may be provided between the controller 1210 and the memory 1240.

The I/O ports 1250 may transmit data to the electronic system 1200, 1300, 1400, or 1500 or transmit data output from the electronic system 1200, 1300, 1400, or 1500 to an external device. For instance, the I/O ports 1250 may include a port for connection with a pointing device such as a computer mouse, a port for connection with a printer, and a port for connection with a universal serial bus (USB) drive.

The expansion card 1260 may be implemented as a secure digital (SD) card or an MMC. The expansion card 1260 may be a subscriber identity module (SIM) card or a universal SIM (USIM) card.

The network device 1270 enables the electronic system 1200, 1300, 1400, or 1500 to be connected with a wired or wireless network. The display 1280 displays data output from the storage 1230, the memory 1240, the I/O ports 1250, the expansion card 1260, or the network device 1270. For example, the display 1280 may include, e.g., a liquid crystal display (LCD), a light emitting diode (LED) display, an organic light emitting diode (OLED) display, or a microelectromechanical systems (MEMS) display, or an electronic paper display.

The camera module 1290 is a module that can convert an optical image into an electrical image. Accordingly, the electrical image output from the camera module 1290 may be stored in the storage 1230, the memory 1240, or the expansion card 1260. In addition, the electrical image output from the camera module 1290 may be displayed through the display 1280. For example, the camera module 1290 may include a camera.

As described above, according to an exemplary embodiment, an application processor allows a scheduler to check the status of a core and to migrate a task to the core based on a check result, thereby preventing performance deterioration that may occur during the migration of the task.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include a read-only memory (ROM), a random-access memory (RAM), a compact disc (CD)-ROM, a digital versatile disc (DVD), a magnetic tape, a floppy disk, and an optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIGS. 1-14 and 17 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An application processor comprising:
   a first core; and
   a second core,
   wherein the first core is configured to implement a scheduler which monitors a workload of a task of the first core, and the first core is further configured to implement an idle checker which determines whether the second core is idle,
   wherein the scheduler determines whether the second core is idle using the idle checker,
   wherein the scheduler calls the idle checker via a first application programming interface (API), and the idle checker, which has been called, determines whether the second core is idle using a second API and sends a result of determining whether the second core is idle to the scheduler via the first API, and sends a migration trigger signal to the scheduler via the first API, in response to determining that the second core is in a wake-up status, to trigger migration of the task to the second core, and
   wherein the scheduler migrates the task from the first core to the second core in response to the migration trigger signal.

2. The application processor of claim 1, wherein the idle checker sends an interrupt to the second core in response to determining that the second core is idle.

3. The application processor of claim 2, wherein the idle checker prevents the second core, which has been woken up in response to the interrupt, from reentering an idle status.

4. The application processor of claim 1, wherein the scheduler comprises a call program for calling the idle checker via the first API.

5. The application processor of claim 4, wherein the call program comprises a migration checker which determines whether to migrate the task to the second core.

6. The application processor of claim 1, wherein the first core and the second core are heterogeneous processor cores.

7. A system on chip, comprising:
   a first cluster, the first cluster comprising a first cache and a first core;
   a second cluster, the second cluster comprising a second cache and a second core;
   an interface connected between the first cache and the second cache; and a memory configured to store a scheduler, which determines a workload of a task of the first core, and an idle checker which determines whether the second core is idle, wherein, when the scheduler and the idle checker stored in the memory are implemented by the first core, the scheduler calls the idle checker via a first application programming interface (API), and wherein the idle checker, which has been called, sends a migration trigger signal to the scheduler to migrate the task to the second core, upon receiving a first control signal indicating that the second core is in a wake-up status, and the scheduler migrates the task from the first core to the second core in response to the migration trigger signal.

8. The system on chip of claim 7, wherein the idle checker determines whether the second core is idle using a second API and sends a result of determining whether the second core is idle to the scheduler via the first API.

9. The system on chip of claim 8, wherein the idle checker sends an interrupt to the second core in response to determining that the second core is idle and sends the migration trigger signal to the scheduler via the first API in response to determining that the second core is in the wake-up status.

10. The system on chip of claim 9, wherein the idle checker prevents the second core, which has been woken up in response to the interrupt, from reentering an idle status.

11. The system on chip of claim 9, further comprising an interrupt controller configured to send the interrupt to the second core based on a second control signal output from the idle checker.

12. The system on chip of claim 9, wherein the scheduler comprises a call program for calling the idle checker via the first API.

13. The system on chip of claim 7, wherein the first core and the second core are heterogeneous processor cores.

14. A computing apparatus comprising:
    at least one memory operable to store program code; and
    at least one processor operable to read the program code and configured to operate as instructed by the program code, the at least one processor comprising:
        a first cluster, the first cluster comprising a first cache and a first core; and
        a second cluster, the second cluster comprising a second cache and a second core, the first cache being connected to the second cache via an interface,
    wherein the program code causes the at least one processor to determine whether to transition a task from the first core to the second core based on a workload of the task,
    wherein, in response to determining that the task is to be transitioned from the first core to the second core, the program code causes the at least one processor to control such that the second core remains in a wake-up status before the task is transitioned to the second core, and
    wherein the program code causes the at least one processor to transition the task to the second core, upon receiving a control signal indicating that the second core is in the wake-up status.

15. The computing apparatus of claim 14, wherein the program code causes the at least one processor to determine whether the second core is in an idle status, wake up the second core in response to determining that the second core is in the idle status, and after the second core is woken up, prevent the second core from reentering the idle status.

16. The computing apparatus of claim 14, wherein the program code causes the at least one processor to monitor the workload of the task, and
    wherein, in response to determining that the task is to be transitioned from the first core to the second core at a current interval and it is determined that the second core is in an idle status, the program code causes the at least one processor to migrate the task to the second core at a next interval after the second core is woken up.

17. The computing apparatus of claim 14, wherein the program code causes the at least one processor to determine whether the second cluster in which the second core is included is in the wake-up status and, in response to determining that the second cluster is in the wake-up status, transition the task from the first core to the second core.

* * * * *